(12) United States Patent
Schlanger

(10) Patent No.: US 9,610,803 B2
(45) Date of Patent: Apr. 4, 2017

(54) QUICK RELEASE SKEWER ASSEMBLY

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 606 days.

(21) Appl. No.: 14/088,429

(22) Filed: Nov. 24, 2013

(65) Prior Publication Data

US 2015/0144009 A1    May 28, 2015

(51) Int. Cl.
*B60B 27/02* (2006.01)
*B60B 1/00* (2006.01)

(52) U.S. Cl.
CPC ............ *B60B 27/026* (2013.01); *B60B 1/003* (2013.01); *B60B 2900/111* (2013.01); *B60B 2900/114* (2013.01); *B60B 2900/1216* (2013.01); *B60B 2900/572* (2013.01)

(58) Field of Classification Search
CPC .... B62K 25/02; B62K 2206/00; B60B 27/026
USPC ........................................................ 301/124.2
See application file for complete search history.

(56) References Cited

U.S. PATENT DOCUMENTS

| | | | | |
|---|---|---|---|---|
| 6,089,675 A * | 7/2000 | Schlanger | ............. | B60B 27/023 280/279 |
| 6,761,417 B2 * | 7/2004 | Denby | ................... | B62K 25/02 301/110.5 |
| 8,272,698 B2 * | 9/2012 | Lin | ........................ | B60B 27/023 280/279 |
| 2008/0246332 A1 * | 10/2008 | Winefordner | ......... | B60B 27/026 301/124.2 |
| 2009/0121538 A1 * | 5/2009 | Chang | .................... | B62K 25/02 301/124.2 |
| 2011/0278912 A1 * | 11/2011 | Schlanger | .............. | B62K 25/02 301/124.2 |
| 2013/0334871 A1 * | 12/2013 | Chang | ................... | B60B 27/026 301/124.2 |
| 2015/0145319 A1 * | 5/2015 | Leuenberger | .......... | B62K 25/02 301/124.2 |

* cited by examiner

*Primary Examiner* — Jason Bellinger

(57) ABSTRACT

A quick release skewer assembly including a skewer shaft with a first end portion and a second end portion axially spaced from the first end portion, a first clamping element connected to the first end portion with a first grip face, a clamping assembly adjacent the second end portion including an anchor element, and a second clamping element with a second grip face. The first grip face is axially separated from the second grip face by a grip distance. The first clamping element is axially and rotationally engaged to the skewer. The anchor element is threadably connected to the skewer shaft such that the grip distance may be selectively threadably adjusted. The clamping assembly is operative to selectively displace the second grip face in a generally linear and axial direction between: (i) an open orientation where the grip distance is axially expanded and distal; and (ii) a closed orientation where the grip distance is axially contracted and proximal relative to the open orientation.

41 Claims, 15 Drawing Sheets

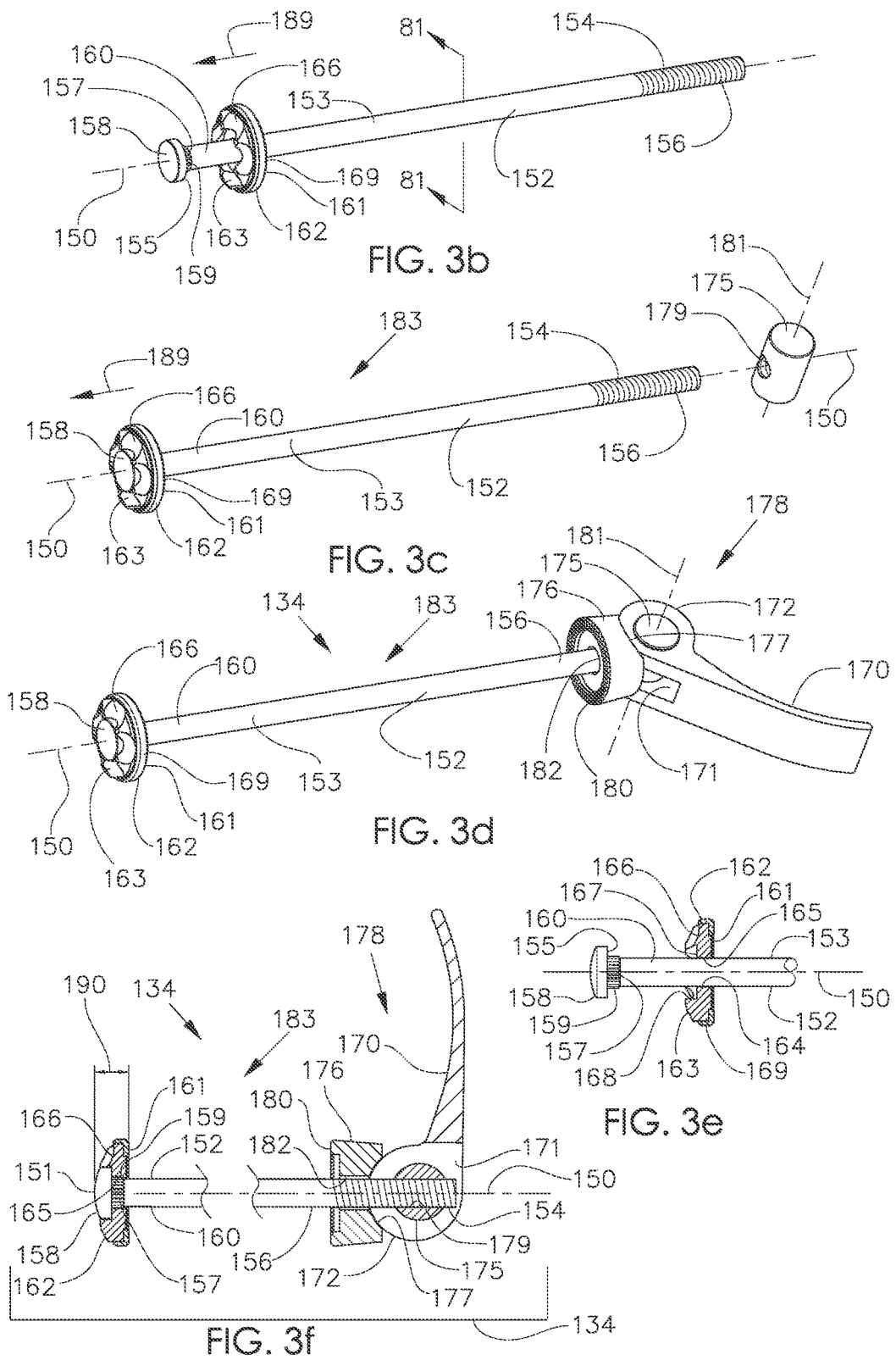

QUICK RELEASE SKEWER ASSEMBLY

CROSS-REFERENCE TO RELATED APPLICATION

This application claims priority of U.S. provisional patent application 61/796,999, filed Nov. 28, 2012 and entitled "QUICK RELEASE HUB ASSEMBLY".

BACKGROUND

Field of the Invention

The present invention relates to a quick release skewer assembly that facilitates the connection between axle of a vehicle wheel and the frame to which the vehicle wheel is mounted. The present invention is particularly applicable to a bicycle wheel quick release skewer assembly that facilitates the connection between axle of a bicycle wheel and the frame of a bicycle.

Discussion of Prior Art

Heretofore, the prior art quick release skewer nut is a large and bulky component that protrudes from the bicycle frame with correspondingly high aerodynamic drag, heavy weight and poor aesthetics. Prior art skewer nuts generally project very far from the outer face of the dropout, usually projecting a distance of 15 to 20 millimeters (mm). For proper function of the skewer nut, it must maintain a large helical thread engagement length with the skewer shaft, particularly if the skewer nut is made of a lighter and softer material such as aluminum. Since this thread engagement is conventionally located axially outboard of the outer face of the dropout, in order to maintain the requisite thread engagement, the nut must also project this large distance. Further, since the skewer nut is so large, the skewer nut is also rather heavy. Still further, since this skewer nut projects so far from the dropout, it has lends poor aesthetics and increased aerodynamic drag to the hub assembly.

SUMMARY OF THE INVENTION

Objects and Advantages

In accordance with the present invention, it has now been found that the forgoing objects and advantages may be readily obtained.

It is an object of the invention to provide a quick release skewer assembly that is low profile, light in weight, aesthetically pleasing, and has minimal aerodynamic resistance. A further object of the invention is its compatibility with existing frame designs.

Since the present invention utilizes a robust engagement between the clamp washer and the skewer shaft, the present invention permits the design of a low profile skewer nut that has minimal axial width and minimal axial outboard protrusion from its associated outer dropout face. The result is a design that is more compact, svelte, and aesthetically pleasing than prior art designs. Further, this minimal axial outboard protrusion results in reduced aerodynamic drag as compared to prior art designs.

Prior art designs show a threadably adjustable engagement between the skewer nut and the first end of the skewer shaft to selectively control and set the axial spacing of opposing grip faces of the quick release assembly. This axial spacing is set prior to clamping by means of the clamping assembly at the second end of the skewer shaft. In contrast, the present invention has a threadably adjustable engagement between the second end of the skewer shaft and the clamping assembly to selectively control and set the axial spacing of opposing grip faces of the quick release assembly. By locating this threadable adjustment at the second end of the skewer shaft, the present invention still retains this adjustment feature, while also maintaining the aesthetics and weight savings of the low profile clamping washer.

It is further noted that the quick release assembly of the present invention may be easily adapted to conventional hub and dropout designs. Thus, the present invention may be fully compatible with existing hub and frame designs. The user need only to swap quick release assembly of the present invention for their prior art quick release assembly. This is important as it allows the present invention to be retrofitted to the vast installed base of preexisting conventional bicycle frames and wheels and does not require manufacturers to make design modifications to new bicycle frames and wheels. The present invention is most commonly adapted to bicycle applications to aid in securing the bicycle wheel to the bicycle frame, however the present invention may be adapted to a wide range of other vehicle applications as well.

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIG. 2b shows the quick release skewer assembly pre-assembled to the hub assembly prior to its mounting in the dropouts;

FIG. 2c shows the hub assembly positioned between the frame dropouts, with the quick release skewer assembly loosely adjusted and the lever in the "open" position;

FIG. 2d shows the hub assembly positioned between the frame dropouts with the quick release skewer assembly properly adjusted and set and with the lever in the "closed" position to clamp the hub assembly with the dropouts;

FIG. 2e is an exploded view showing the hub assembly and quick release skewer assembly prior to their assembly;

FIG. 2f shows an assembly sequence identical to that shown in FIG. 2b, with the quick release skewer assembly pre-assembled to the hub assembly prior to its mounting in the dropouts;

FIG. 2g shows an assembly sequence identical to that shown in FIG. 2c, with the hub assembly positioned between the frame dropouts and with the quick release skewer assembly loosely adjusted and the lever in the "open" position;

FIG. 2h shows an assembly sequence identical to that shown in FIG. 2d, with the hub assembly positioned between the frame dropouts and with the quick release skewer assembly properly adjusted and with the lever in the "closed" position to axially clamp the hub assembly to the dropouts;

FIGS. 3b-i are views of the embodiment of FIG. 3a, showing the progressive sequential steps involved in assembling the skewer assembly and then mounting the skewer and hub assemblies to the frame;

FIG. 3b is an exploded perspective view of the skewer shaft and clamp washer, shown prior to the pressed assembly of the clamp washer with the skewer shaft;

FIG. 3c is an exploded perspective view of the assembled skewer shaft and clamp washer, shown prior to the threadable assembly with the barrel nut;

FIG. 3d is a perspective view of the assembled skewer assembly, with the skewer shaft threadably assembled with the barrel nut, and including the clamping assembly;

FIG. 3e is a partial cross section view taken along 81-81, corresponding to the assembly sequence of FIG. 3b, shown prior to the pressed assembly of the clamp washer with the skewer shaft;

FIG. 3f is a partial cross section view taken along 81-81, corresponding to the assembly sequence of FIG. 3i, showing the pressed assembly of the clamp washer and skewer shaft, also with the skewer shaft threadably assembled with the barrel nut, and including the clamping assembly shown in the closed position;

FIG. 3g is a perspective view, showing the skewer assembly pre-assembled to the hub assembly prior to its mounting to the dropouts;

FIG. 3h is a perspective view, showing the skewer and hub assemblies of FIG. 3g as next positioned between the frame dropouts, with the quick release skewer assembly loosely adjusted and set and the lever in the "open" position;

FIG. 3i is a perspective view, showing the skewer and hub assemblies of FIG. 3h, with the lever next moved to the "closed" position to clamp the dropouts;

FIG. 4a is an exploded perspective view of the skewer shaft, clamp washer, and retainer, shown prior to the assembly of the clamp washer and retainer with the skewer shaft;

FIG. 4b is a perspective view of the assembled skewer shaft, clamp washer, and retainer, shown prior to the threadable assembly with a barrel nut;

FIG. 4c is a partial cross section view taken along 126-126, corresponding to the assembly sequence of FIG. 4a, shown prior to the assembly of the clamp washer and retainer with the skewer shaft;

FIG. 4d is a partial cross section view taken along 126-126, corresponding to the assembly sequence of FIG. 4b, showing the assembled skewer shaft, clamp washer, and retainer prior to the threadable assembly with a barrel nut;

DETAILED DESCRIPTION OF THE INVENTION

Figure 1:
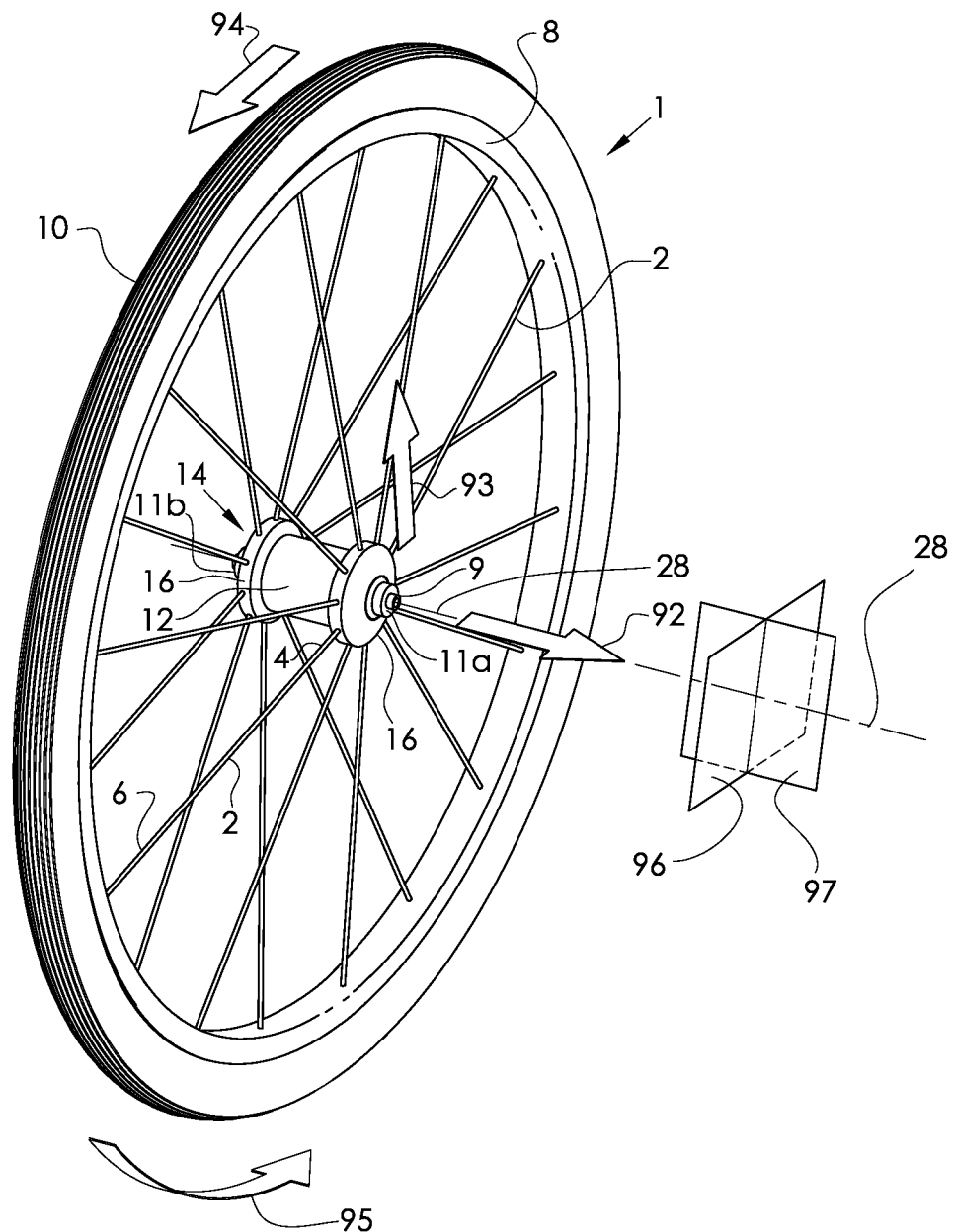
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the frame and the quick release skewer assembly are not shown in this figure. The hub shell 14 is rotatable about the axle 9 and includes at least two axially spaced hub flanges 16, each of which include a means for connecting with the spokes 2. Axle 9 includes end faces 11a and 11b that define the spacing of its mounting with the frame (not shown). The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps circumferentially around the axial axis 28 at a given radius. A radial plane 96 is a plane perpendicular to the axial axis 28 that extends in a generally radial direction at a given axial intercept. An axial plane 97 is a plane that is generally parallel to the axial axis. An axially inboard (or inward) orientation is an orientation that is axially proximal to the axial midpoint between the two end faces 11a and 11b. Conversely, an axially outboard (or outward) orientation is an orientation that is axially distal from the axial midpoint between the two end faces 11a and 11b. A radially inboard (or inward) orientation is an orientation that is radially proximal to the axial axis 28 and a radially outboard (or outward) orientation is an orientation that is radially distal from the axial axis 28. An axially inwardly facing surface is a generally radial planar surface that faces toward the axial midpoint between the two end faces 11a and 11b. Conversely, an axially outwardly facing surface is a generally radial planar surface that faces away from the axial midpoint between the two end faces 11a and 11b.

While it is most common for the hub shell 14 to rotate about a fixed axle 9, there are some cases where it is desirable to permit the axle 9 to be fixed with the wheel 1 such as the case where the wheel 1 is driven by the axle 9.

For general definition purposes herein, an "integral" joinder is one that is integrated and may not be easily disassembled at the service temperature without damaging at least one of the components that are joined or is difficult to disassemble or is otherwise not meant to be disassembled. This integral joinder involves a joining interface directly between two components. This joining interface is often a welded or adhered interface or some other interface where the two joining surfaces are solidly joined to each other to create a unified structure. Preferably this joining interface is a surface interface, rather than a point or edge interface. The integral joinder is in contrast to a fastened joinder, where such a fastened joinder relies solely on a mechanically interlocked engagement to secure or connect the two components to each other. The term "integral" refers to two portions that are unitary, and/or integrally joined. Further, when two portions are considered "monolithic" with each other, they may be considered to be integrally and monolithically combined as a singular unitary element with no interface between the two portions.

FIGS. 2a-h show a typical prior art quick release hub assembly 30, with dropouts 32a and 32b and quick release skewer assembly 34. The dropouts 32a and 32b may be considered mounting portions and constitute the portion of the frame (not shown) to which the hub assembly 30 is mounted or connected. Dropout 32a includes open slot 36a with slot width 37a, axially inboard face 38a, and axially outboard face 40a. Similarly, dropout 32b includes open slot 36b with slot width 37b, axially inboard face 38b, and axially outboard face 40b. Inboard faces 38a and 38b are axially opposed and face each other, while outer faces 40a and 40b are axially opposed and face away from each other. Slot widths 37a and 37b are sized to accept the corresponding axle stubs 48a and 48b respectively. The dropouts 32a and 32b shown here are more typical of the front dropouts of a bicycle frame, but the rear dropouts are similar in design and it is understood that this design is representative of a wide range of dropout designs, including front and rear dropouts, and including conventional or unconventional dropouts.

The hub assembly 30 includes an axle assembly 44 and a hub shell 14 with hub flanges 16a and 16b. In this case, the axle assembly 44 is generally stationary and fixed to the frame of the bicycle, while the hub shell 14 is rotatable about the axle assembly 44 by means of bearing assemblies (visible in FIGS. 2e-h) about axial axis 28. The hub shell 14 includes and two hub flanges 16a and 16b that are adapted to connect with the inner ends of spokes (not shown) in the conventional manner. The axle assembly 44 includes axlecaps 42a and 42b and tubular axle 43. Axlecap 42a includes outer face 46a, axle stub 48a of stub width 49a, and axially extending hole 50a therethrough. Similarly, axlecap 42b includes outer face 46b, axle stub 48b of stub width 49b, and axially extending hole 50b therethrough. Outer faces 46a and 46b are generally axially opposed and face away from each other. Holes 50a and 50b constitute the exposed openings of a continuous axial hole that extends axially through the axle assembly 44 to accept the skewer shaft 52 of the quick release skewer assembly 34. The stub width 49a and 49b correspond to the circular diameter of the axle stubs 48a and 48b and are sized to easily fit within slots 36a and 36b respectively and to provide radial positioning alignment between the hub assembly 30 and the dropouts 32a and 32b when they are nested within corresponding slots 36a and 36b.

The quick release skewer assembly 34 includes skewer shaft 52, adjusting nut 62, cam-actuated clamping assembly 58 and springs 80a and 80b. Skewer shaft 52 includes a male threaded portion 54 at its first end 56 and is fixed to the barrel nut 74 of the clamping assembly 58 at its second end 60. Springs 80a and 80b are helical compression springs, commonly in a conical configuration, which permits the coils to overlap each other upon compression. Adjusting nut 62 includes an internally threaded hole 64 to threadably mate with threaded portion 54, a knurled surface 66 to facilitate its manual manipulation, and an axially inward-facing grip face 68 to bear against the outer face 40a of dropout 32a. Clamping assembly 58 includes lever 70 with a cam surface 72, and a follower bushing 76 with a follower surface 77 and an axially inward-facing grip face 78. The barrel nut 74 serves as an axle pin about which the lever 70 is pivoted, including pivot axis 75. As the lever 70 is rotated about the barrel nut 74 and pivot axis 75, the cam surface 72 cams against the follower surface 77, causing the follower bushing 76 to be selectively displaced in the axial direction such that the grip face 78 is axially moveable relative to the barrel nut 74 and the skewer shaft 52. Thus, it may be seen that the quick release skewer assembly 34 has two means to adjust the axial separation of grip faces 68 and 78: (i) the threadable engagement between threaded portion 54 and threaded hole 64 and (ii) the camming interface between the cam surface 72 and follower surface 77.

Figure 2A:
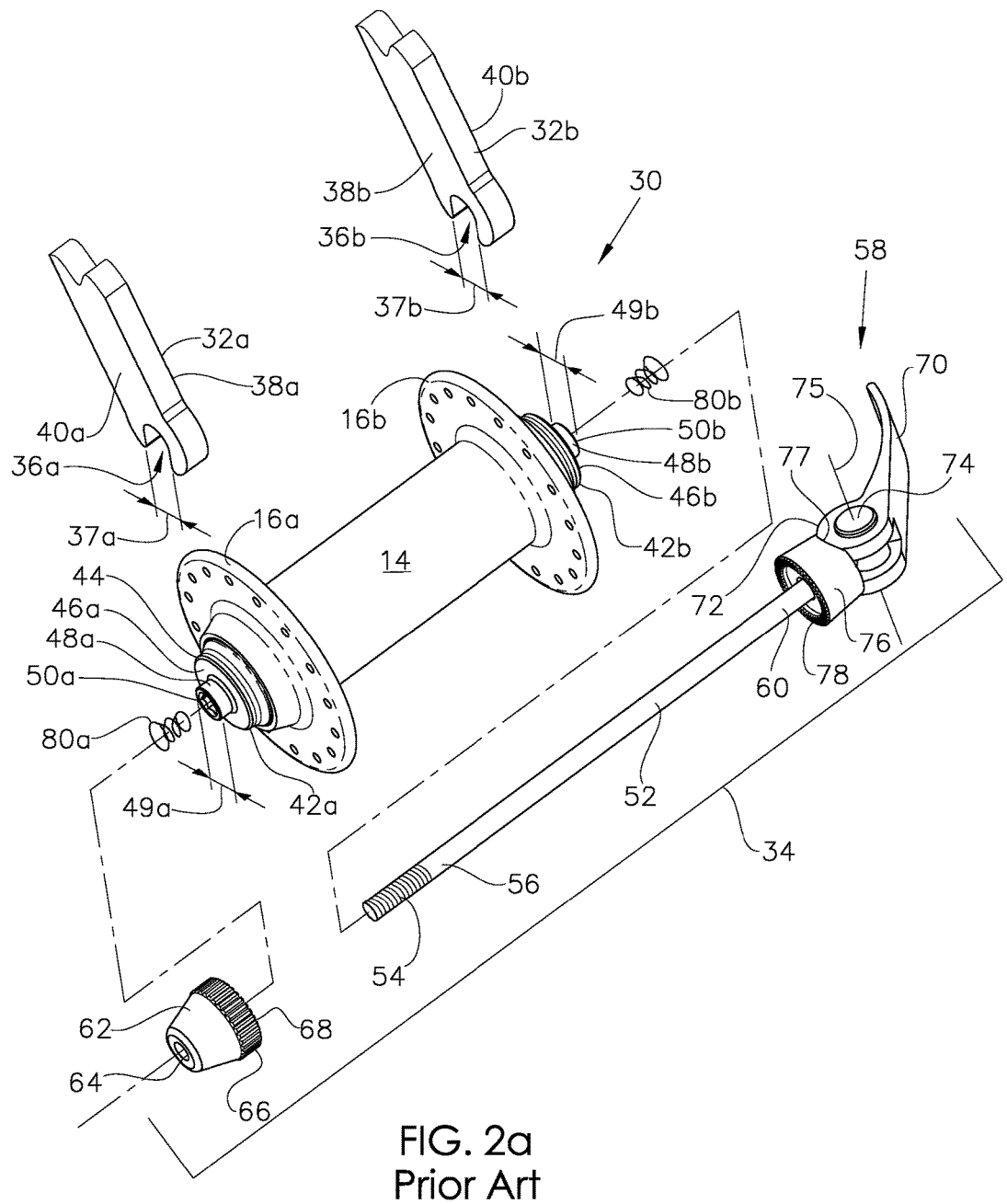
FIG. 2a is an exploded perspective view of a prior art hub assembly, including the dropouts of a frame and a conventional quick release skewer assembly.
Figure 2B:
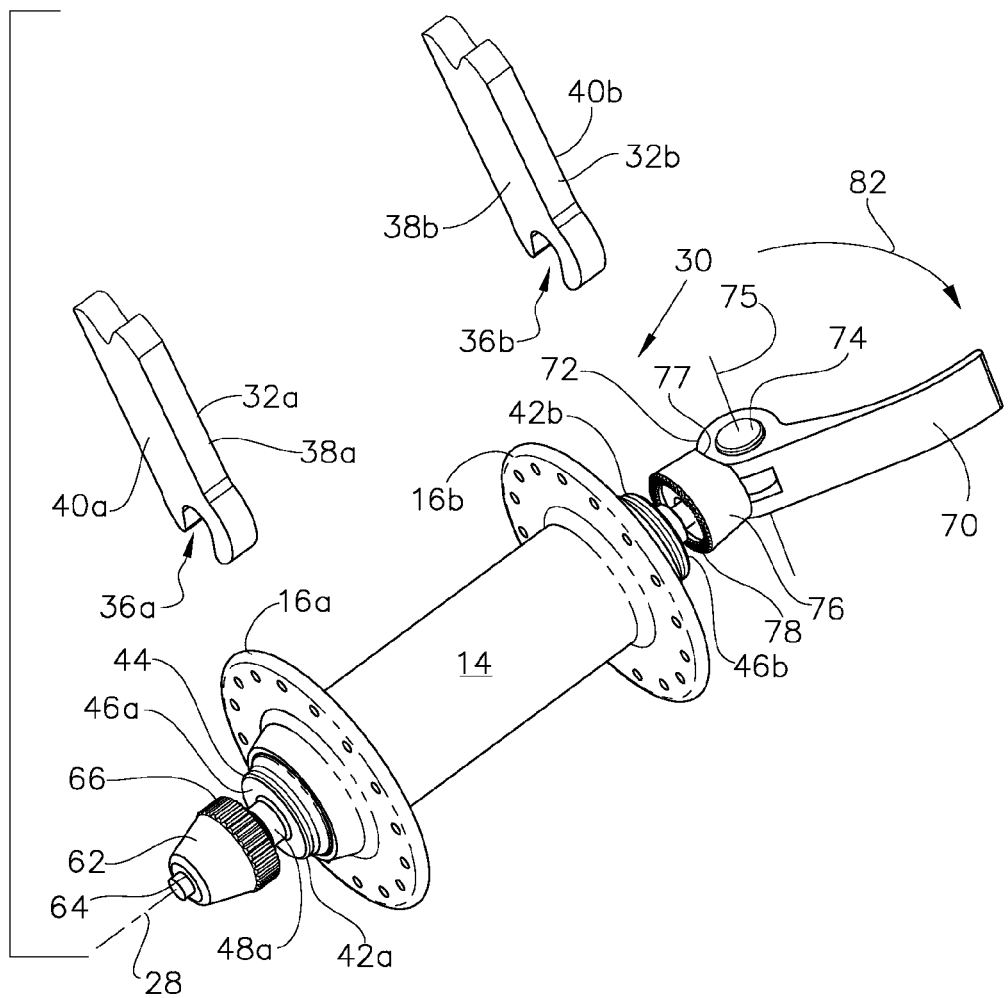
FIGS. 2b-d are exploded perspective views of the prior art hub assembly of FIG. 2a, showing the progressive sequential steps involved in mounting the hub assembly to the frame.

FIG. 2a shows the components of the hub assembly 30, quick release skewer assembly 34, and dropouts 32a and 32b in exploded view for clarity. FIG. 2b shows the quick release skewer assembly 34 as pre-assembled to the hub assembly 30, with skewer shaft 52 extending through holes 50a and 50b and adjusting nut 62 threadably pre-assembled to threaded portion 54 of skewer shaft 52. Refer to FIGS. 2e-h for items described but not otherwise shown in FIGS. 2a-d. The skewer shaft 52, with clamping assembly 58 affixed thereto, is first passed through the spring 80b and through hole 50b such that its first end 56 extends through hole 50a. The spring 80a is then assembled over the exposed first end 56 of skewer shaft 52 and adjusting nut 62 is loosely threaded onto the exposed end of skewer shaft 52, with threaded hole 64 threadably engaged with threaded portion 54 as shown in FIG. 2b. The hub assembly 30 is then aligned with dropouts 32a and 32b such that inboard face 38a is axially aligned with outer face 46a and inboard face 38b is axially aligned with outer face 46b. The lever 70 is moved in direction 82 into the "open" position, such that the cam interface between cam surface 72 and follower bushing 76 places the clamping assembly 58 in the retracted position to place the follower bushing in an axially outboard orientation relative to the barrel nut 74, thus providing maximum axial separation between grip faces 68 and 78. Springs 80a and 80b serve to bias the adjusting nut 62 and the follower bushing 76 in their axially separated and spread position relative to outer faces 46a and 46b respectively and to maintain an open gap therebetween.

Figure 2C:
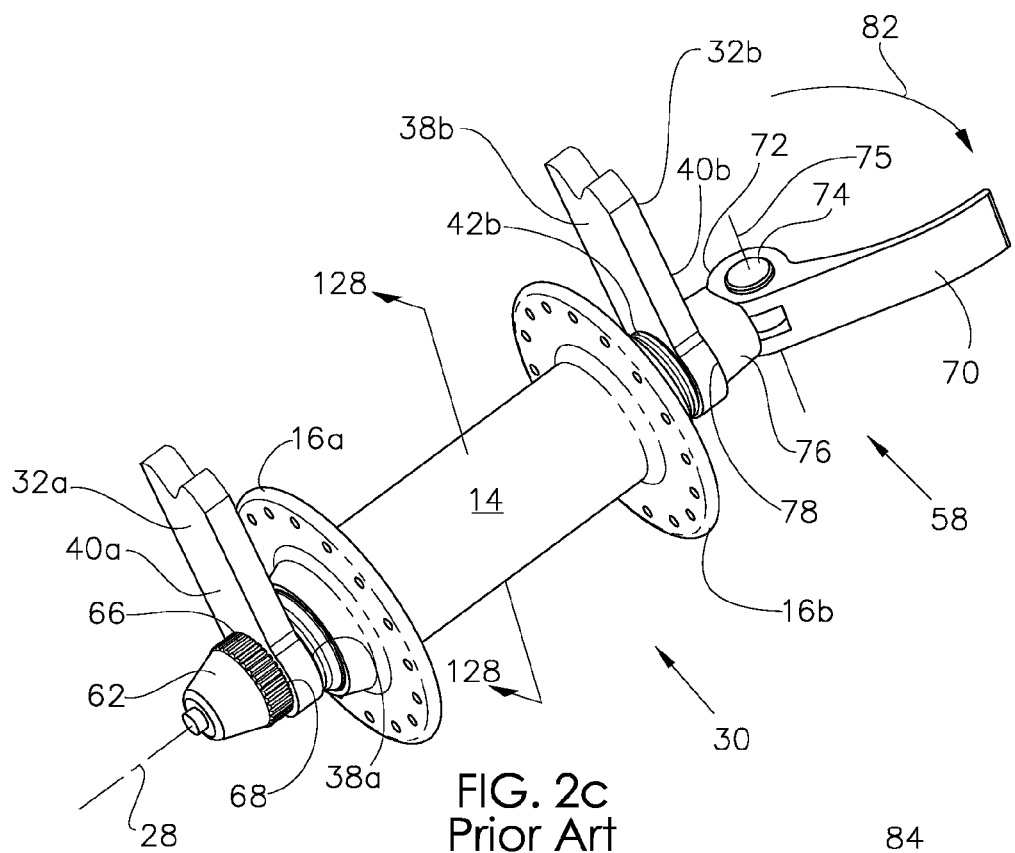

FIG. 2c shows the hub assembly 30 as next pre-assembled and positioned within the dropouts 32a and 32b. Axle stubs 48a and 48b are radially presented to slots 36a and 36b respectively and nested therein to provide radial positioning alignment between the hub assembly 30 and the dropouts 32a and 32b. Also, inboard faces 38a and 38b are now loosely contacting outer faces 46a and 46b respectively. The adjusting nut 62 is then threadably adjusted relative to the skewer shaft 52, by means of the threadable engagement between threaded portion 54 and threaded hole 64, such that the axial separation between grip faces 68 and 78 is set to the desired distance. The lever 70 is still shown in the "open" position.

Figure 2D:
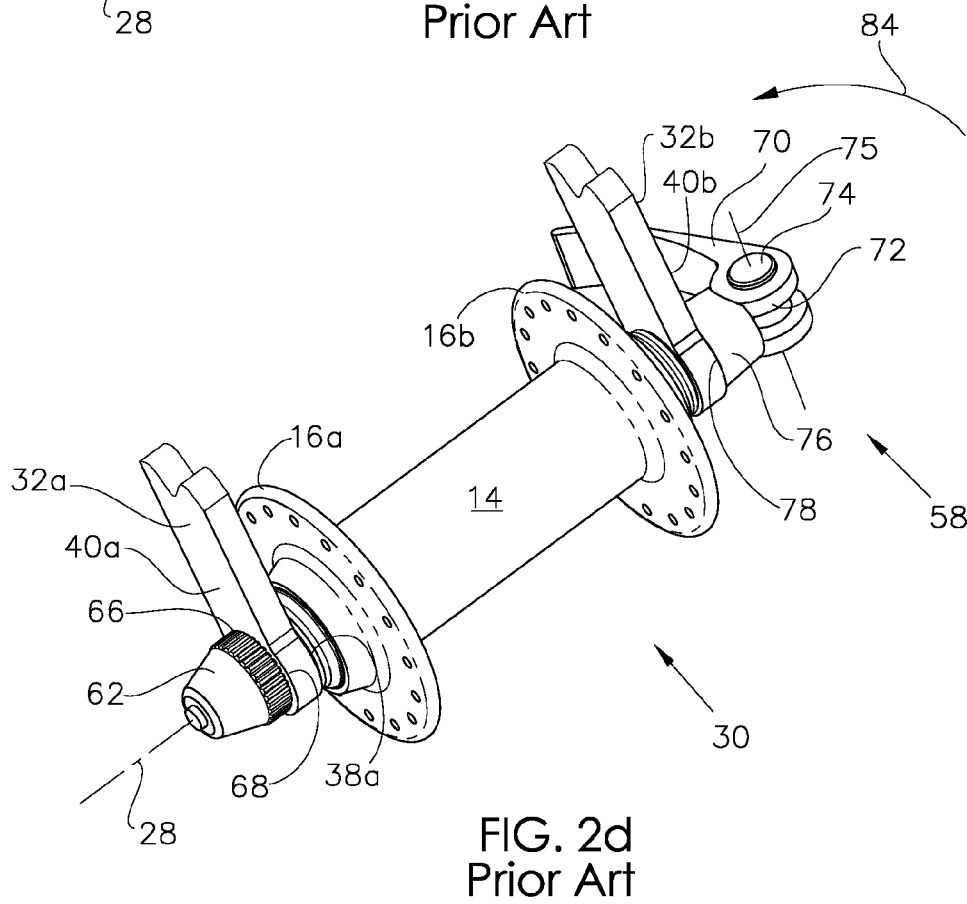

Next, as shown in FIG. 2d, the lever 70 is moved in direction 84 into the "closed" position, such that the cam interface between cam surface 72 and follower surface 77 of the follower bushing 76 is in the extended position, with follower bushing 76 moved axially inward relative to the barrel nut 74 to bias and press grip faces 68 and 78 axially toward each other by means of the skewer shaft 52. Grip face 68 is thereby pressed and clamped against outboard face 40a, and inboard face 38a is also pressed and clamped against outer face 46a. Simultaneously, grip face 78 is now pressed and clamped against outboard face 40b, and inboard face 38b is also pressed and clamped against outer face 46b. Thus, dropout 32a is now axially sandwiched and clamped between grip face 68 and outer face 46a and dropout 32b is now axially sandwiched and clamped between grip face 78 and outer face 46b. The hub assembly 30 is now firmly assembled to both dropouts 32a and 32b.

Figure 2E:
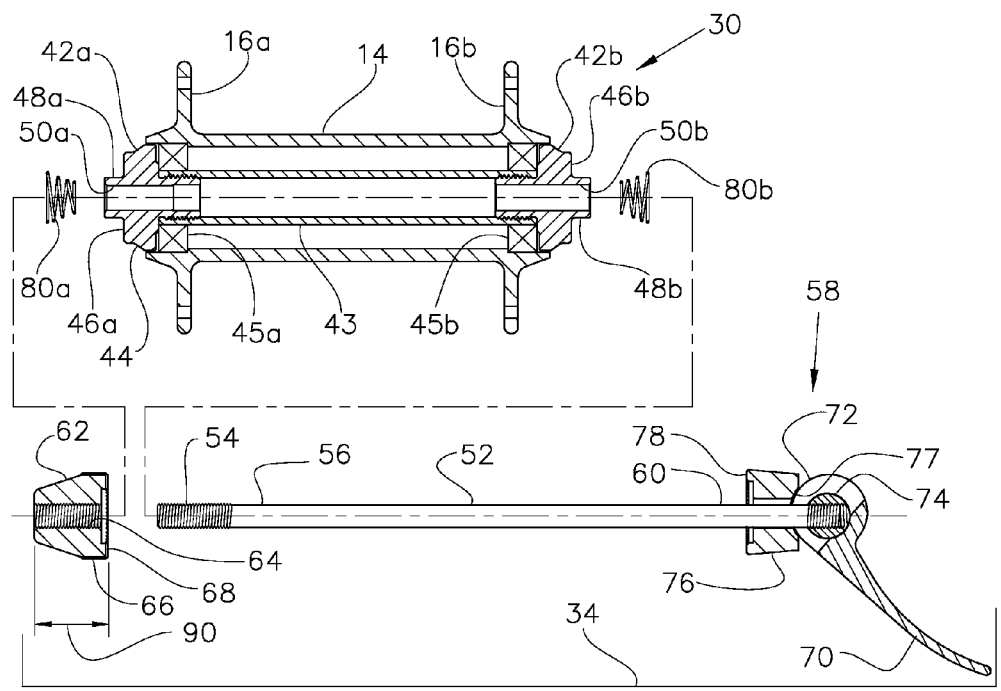
FIGS. 2e-h are axial cross-sectional views, taken along 128-128, of the embodiment of FIG. 2a, showing the progressive sequential steps involved in mounting the hub assembly to the frame.

FIG. 2e corresponds to FIG. 2a and shows the hub assembly 30 and skewer assembly 34 in cross section for further clarity. It is shown that the axle assembly 44 is made up of axlecaps 42a and 42b and a tubular axle 43. Hub shell 14 is rotatable about the axle assembly 44 via bearing assemblies 45a and 45b. FIGS. 2e-h illustrate that holes 50a and 50b constitute the exposed openings of a continuous axial hole that extends axially through axlecaps 42a and 42b and tubular axle 43.

Figure 2F:
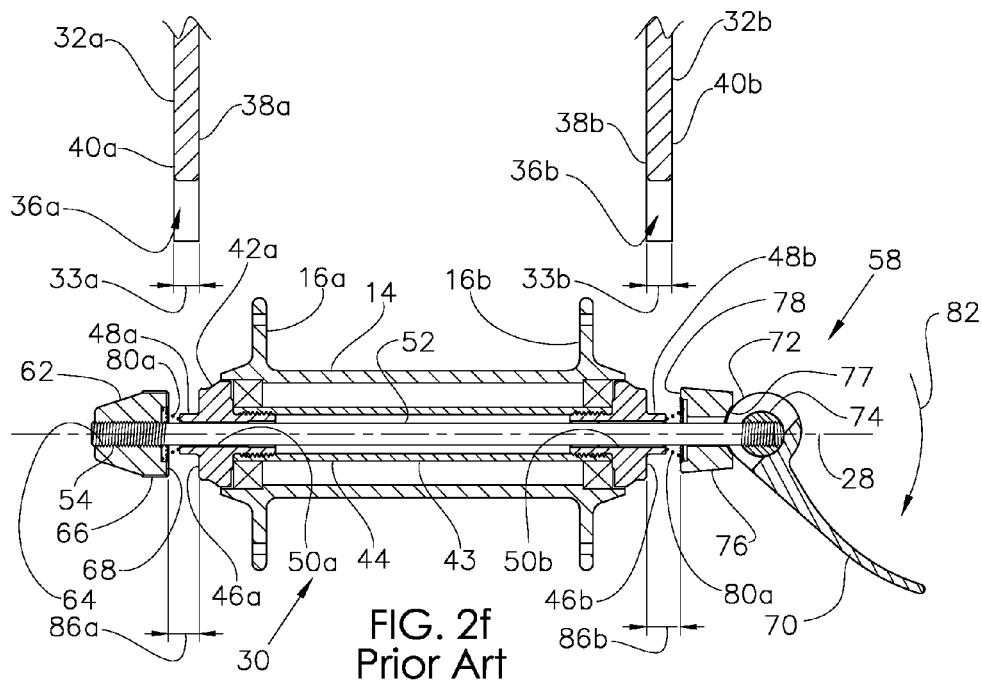

FIG. 2f corresponds to FIG. 2b and shows the hub assembly 30, skewer assembly 34, and dropouts 32a and 32b in cross section for further clarity. Dropouts 32a and 32b have axial thickness 33a and 33b respectively. Correspondingly, gap 86a exists between grip face 68 and outer face 46a and gap 86b exists between grip face 78 and outer face 46b. In this figure, with the lever 70 in the "open" position, gaps 86a and 86b are shown in their open and expanded position such that gap 86a is greater than thickness 33a and gap 86b is greater than thickness 33b to provide axial clearance for the hub assembly 30 and skewer assembly 34 to next be assembled to dropouts 32a and 32b.

Figure 2G:
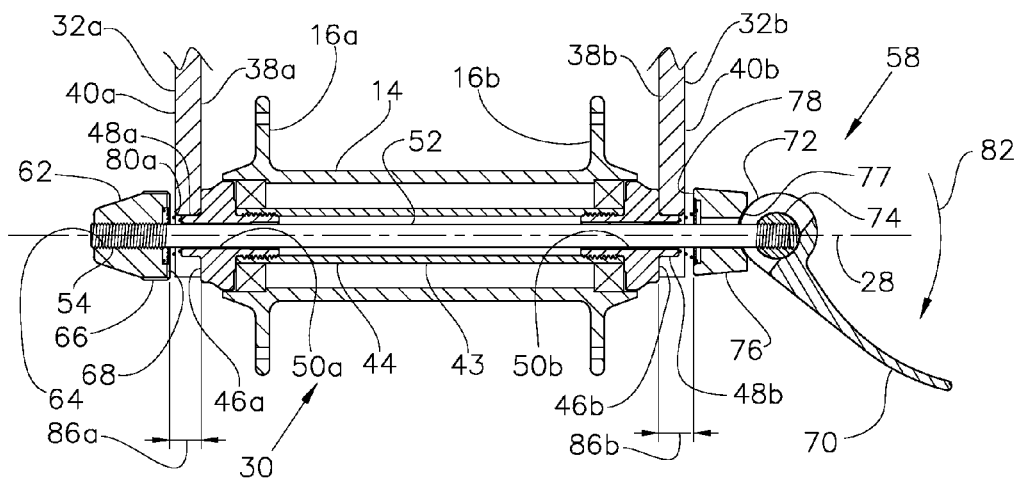

FIG. 2g corresponds to FIG. 2c and shows the hub assembly 30, skewer assembly 34, and dropouts 32a and 32b in cross section for further clarity. Axle stubs 48a and 48b have been radially assembled to dropouts 32a and 32b and are now nested within slots 36a and 36b respectively to provide radial positioning alignment between the hub assembly 30 and the dropouts 32a and 32b. Lever 70 is still in the "open" position and inboard faces 38a and 38b are now loosely contacting outer faces 46a and 46b respectively.

Also axial clearance exists between grip face 68 and outboard face 40a and between grip face 78 and outboard face 40b.

Figure 2H:
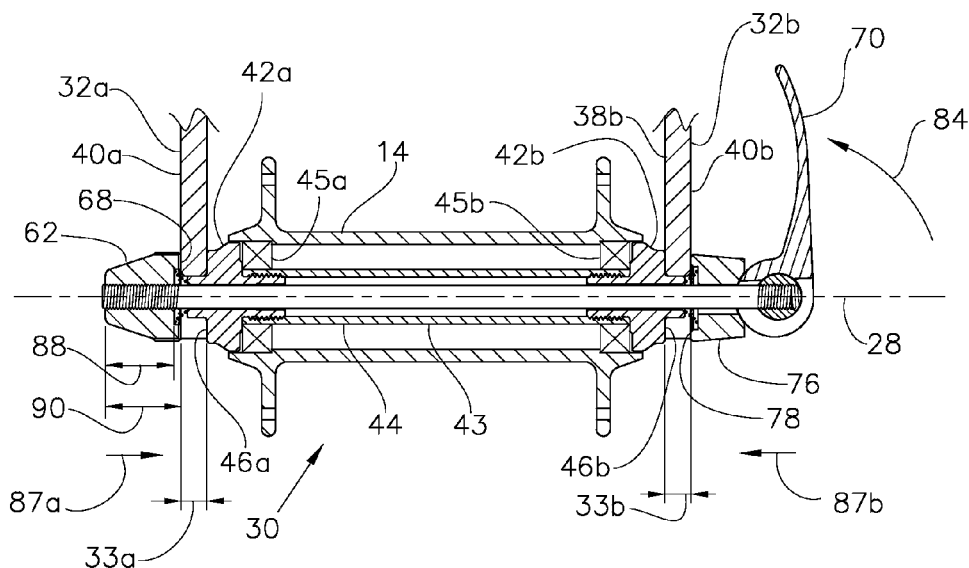

FIG. 2h corresponds to FIG. 2d and shows the hub assembly 30, skewer assembly 34, and dropouts in cross section for further clarity. Lever 70 is now moved in direction 84 into the "closed" position such that cam surface 72 cams against follower surface 77 to displace follower bushing 76 in direction 87b and adjusting nut 62 in direction 87a (by means of skewer shaft 52). Gaps 86a and 86b are thereby reduced and closed such that grip face 68 is now pressed and clamped against outboard face 40a, and inboard face 38a is also pressed and clamped against outer face 46a. Simultaneously, grip face 78 is now pressed and clamped against outboard face 40b, and inboard face 38b is also pressed and clamped against outer face 46b. Thus, dropout 32a is now sandwiched and clamped between grip face 68 and outboard face 40a and dropout 32b is now sandwiched and clamped between grip face 78 and outboard face 40b.

It should be noted that the threaded engagement between the threaded portion 54 of the skewer shaft 52 and the threaded hole 64 of the adjusting nut 62 is located entirely axially outboard of the outboard surface 40a of the dropout 32a. A certain minimum thread engagement length 88 is necessary to prevent stripping and/or damage to this threaded engagement under the cam-actuated clamping load provided by the clamping assembly 58, as described in FIGS. 2d and 2h. Since this thread engagement length 88 is located outboard of the outboard surface 40a, the projecting axial width 90 of the adjusting nut 62 must be substantial and, at minimum, correspond to the thread engagement length 88. Thus, with such prior art designs, the axial width 90 of the adjusting nut 62 must protrude from the outboard surface 40a by a large width 90 dimension, which is typically around 20 mm, and which results in increased weight and aerodynamic drag. Further, this bulky protrusion from outboard surface 40a is aesthetically unappealing. It is also noted that the radial locating and alignment of the hub assembly 30 and quick release skewer assembly 34 is provided by the nested radial engagement between the axle stubs 48a and 48b and the slots 36a and 36b respectively. These axle stubs 48a and 48b are an integral part of the axle assembly 44 and extend axially outwardly from their respective outer faces 46a and 46b.

Figure 3A:
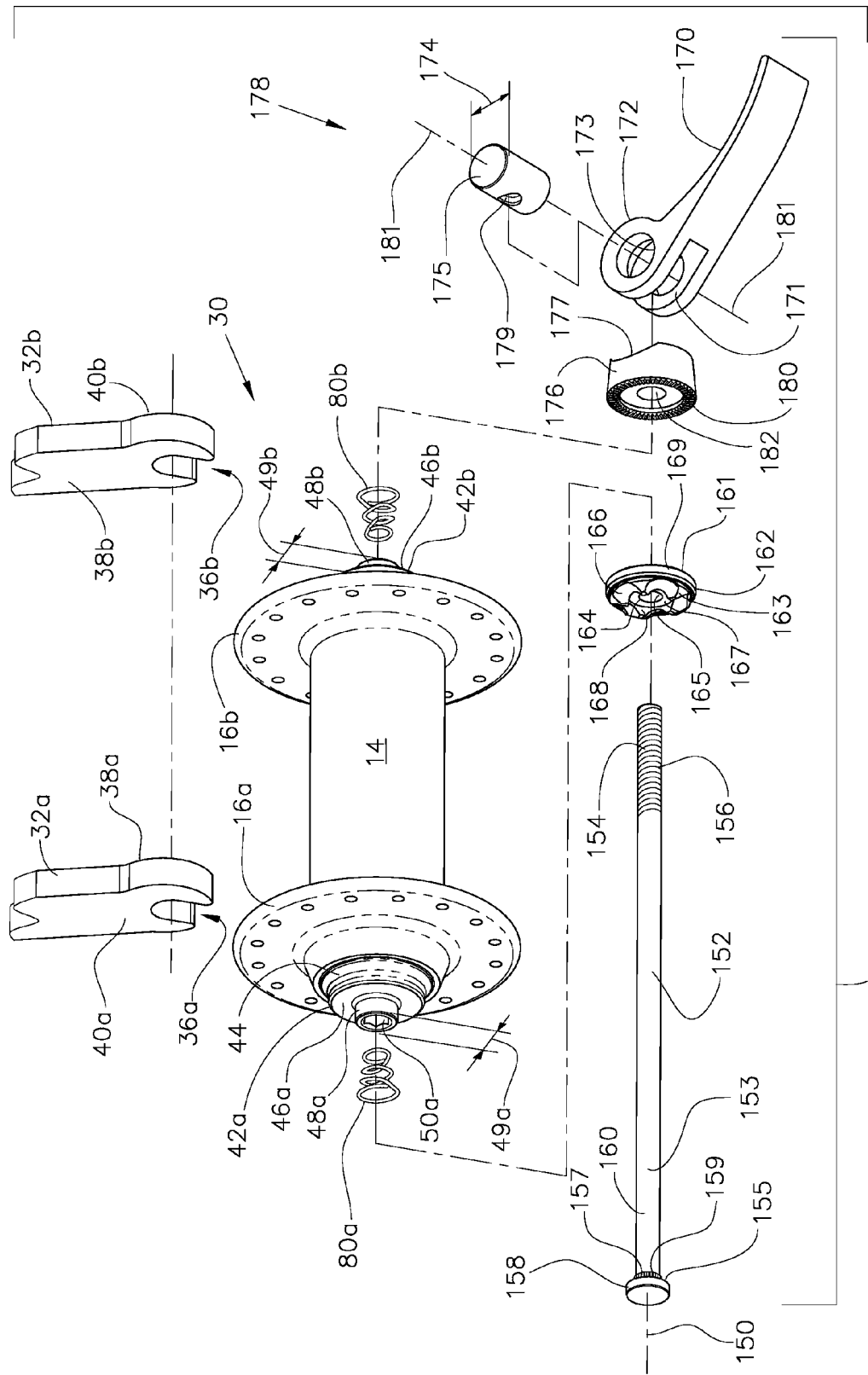
FIG. 3a is an is an exploded perspective view of a first embodiment of the present invention, showing the hub assembly, the dropouts of a frame, and the quick release skewer assembly.

FIGS. 3a-k show a first embodiment of the present invention. Hub assembly 30 and dropouts 32a and 32b are identical in form and function to those described in FIGS. 2a-h. As shown in FIG. 3a, the quick release skewer assembly 134 includes skewer shaft 152, clamp washer 162, and cam-actuated clamping assembly 178. Skewer shaft 152 extends along a shaft axis 150 and includes a shank portion 153, a male threaded portion 154 at its second end 156, and an enlarged portion 158 adjacent its first end 160. Skewer shaft 152 also includes a transition surface 155 extending radially outwardly between the shank portion 153 and the enlarged portion 158, and a raised configured surface 157 in the shank portion 153 adjacent the transition surface 155. The configured surface 157 consists of a series of raised ribs 159 aligned longitudinally and generally parallel to the shaft axis 150. The skewer shaft 152 is shown to be radially centered with the hub assembly 30 with the shaft axis 150 generally collinear with the axial axis 28. Alternatively, the skewer shaft 152 may be radially offset from the hub assembly 30, with the shaft axis 150 correspondingly offset and eccentric relative to the axial axis 28.

Clamp washer 162 includes a hole 164 therethrough with a hole sidewall 165, an axially inward-facing grip face 161 to bear against the outer face 40*a* of dropout 32*a*, and a circumferential configured surface 166. Configured surface 166 consists of a series of circumferentially alternating recessed surfaces and raised projecting surfaces around its perimeter, to facilitate its manual gripping and manipulation. These projecting surface(s) may be axially and/or radially outboard relative to the recessed surfaces. Clamp washer 162 also includes a recess or counterbore 168 with a radially extending step face 167 adjacent the hole 164. The clamp washer 162 is shown to be a two-piece assembly consisting of: (i) a washer body 163, which includes the configured surface 166, the hole 164, the counterbore 168, and the step face 167; and (ii) a gripping ring 169 that is connected to the washer body 163 and includes the grip face 161. The gripping ring 169 may be of harder material, such as stainless steel, that may serve to bite and grip the dropout 32*a* for additional clamping security, while the washer body 163 may be of lighter weight material, such as aluminum, to minimize the overall weight of the skewer assembly 134.

Clamping assembly 178 is of a conventional arrangement similar to clamping assembly 58 and includes a lever 170, a barrel nut 175 and a follower bushing 176. The lever 170 serves as a handle to provide a manual interface for clamping of the skewer assembly 134 as described herein. Lever 170 is bifurcated by slot 171 and includes a cross hole 173 extending perpendicular to the slot 171. Barrel nut 175 is a generally circular cylindrical element about pivot axis 181 with a diameter 174 sized to fit within hole 173, and serves as a pivot pin for the lever 170. Barrel nut 175 includes an internally threaded cross hole 179 extending therethrough and generally perpendicular to pivot axis 181. Follower bushing 176 includes an axial opening 182 therethrough, a follower surface 177, and an axially inward-facing grip face 180.

FIG. 3*b* shows the clamp washer 162 as first pre-assembled to the skewer shaft 152 in direction 189, with the shank portion 153 and second end 156 extending through the hole 164. Next, FIG. 3*c* shows the clamp washer 162 further assembled to the skewer shaft 152 in direction 189 until the transition surface 155 abuts the step face 167. This abutting engagement insures that the clamp washer 162 is now axially fixed to the skewer shaft 152 such that the clamp washer 162 may not be further displaced in direction 189 relative to the skewer shaft 152. Further, as the hole 164 is pressed past the configured surface 157 in direction 189, the raised ribs 159 emboss and deform the hole sidewall 165 such that the hole sidewall 165 plastically conforms to match the contour of ribs 159 of configured surface 157. Additionally, the hole elastically expands to accommodate the raised ribs 159, resulting in a frictionally gripping interference fit or press fit therebetween. The result is a rotationally gripping and rotationally keyed engagement (about the shaft axis 150) and an axial gripping engagement between the ribs 159 of the skewer shaft 152 and the hole sidewall 165 of the clamp washer 162. The clamp washer 162 is now joined to the skewer shaft 152 to create shaft assembly 183. This friction press fit between the hole sidewall 165 and the configured surface 157 serves to axially retain the clamp washer 162 to the skewer shaft 152 and to maintain the rotational engagement therebetween and also to maintain the abutting overlie engagement between the transition surface 155 and the step face 167.

Figure 3G:
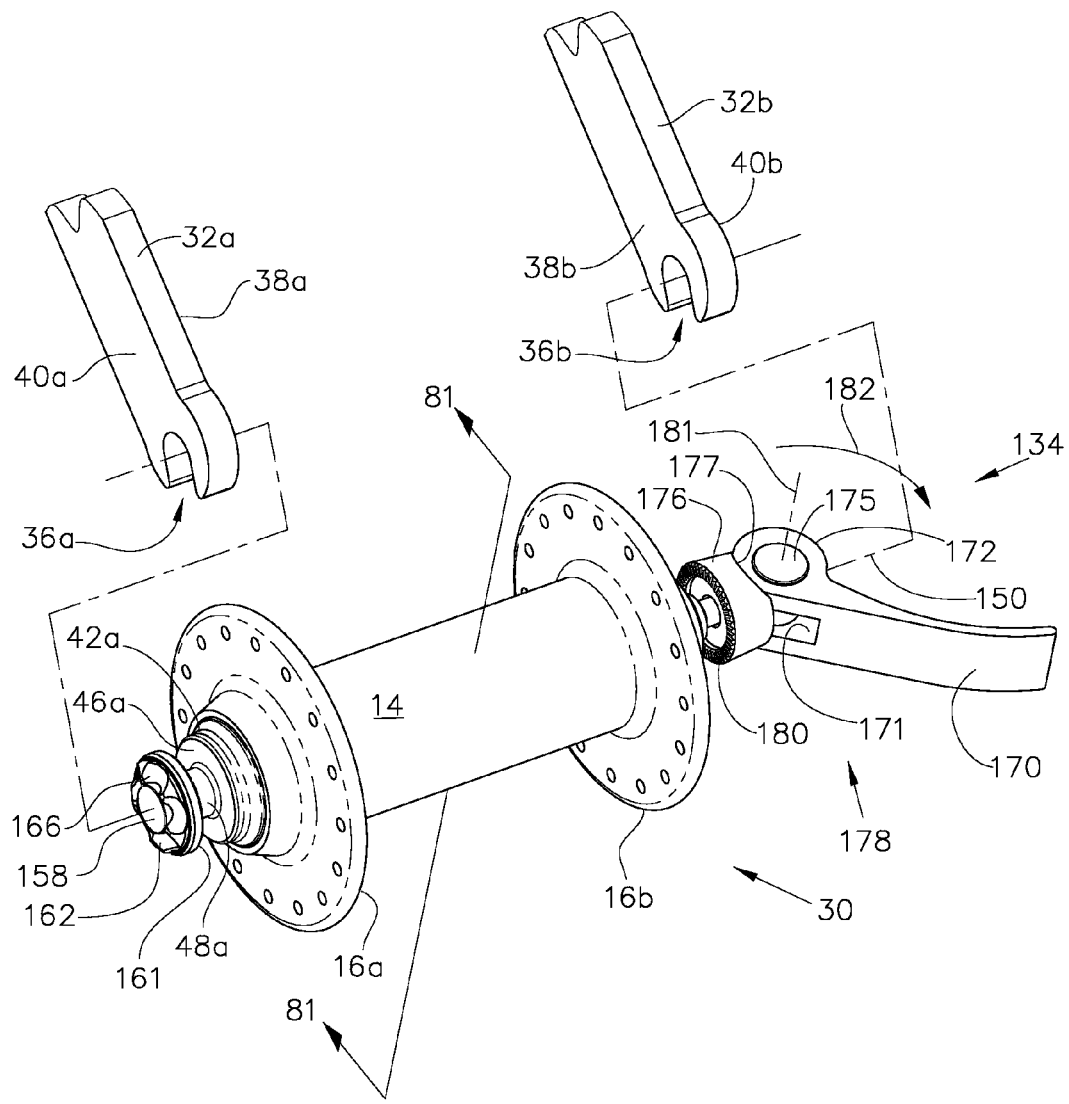

FIG. 3*c* also shows the barrel nut 175, with the externally threaded portion 154 aligned with the internally threaded cross hole 179 for subsequent threadable assembly therebetween (for clarity, lever 170 and follower bushing 176 are not shown in FIG. 3*c*). Next, FIG. 3*d* shows the assembled skewer assembly 134, with the skewer shaft 152, clamp washer 162, and clamping assembly 178. The barrel nut 175 is first assembled within the hole 173 such that the cross hole 179 is aligned within the slot 171. Then the second end 156 is assembled through opening 182 and through the slot 171 to be threadably assembled to the cross hole 179, with threaded portion 154 threadably engaged to internally threaded cross hole 179. FIG. 3*d* shows the completed skewer assembly 134 outside of the hub assembly 30 for illustration purposes. Normally the skewer assembly 134 is assembled to include the hub assembly 30 as shown in FIG. 3*g*. FIG. 3*e* corresponds to FIG. 3*b* and is provided for greater detail and clarity. FIG. 3*f* corresponds to FIG. 3*d* and is provided for greater detail and clarity. FIG. 3*f* also shows the exposed axial width 190 between the axially outboard terminus 151 of the shaft assembly 183 and the grip face 161. In the prior art arrangement of FIGS. 2*a-h*, which relies on a threaded engagement between the skewer shaft 52 and adjusting nut 62, the width 90 must be substantial enough to provide enough thread engagement width 88 to support the clamping force provided by the clamping assembly 58 without damaging the threaded engagement. In contrast, the embodiment FIGS. 3*a-k* shows an overlie engagement between the skewer shaft 152 and clamp washer 162, which does not require such a substantial axial length of engagement. As such, the axial width 190 of the clamp washer 162 may be significantly smaller than the width 90. An axial width of 12 mm or 10 mm may be achievable with the present invention and is highly advantageous over the prior art designs with larger axial widths on the order of 20 mm or greater. This reduced width 190 allows for reduced axial protrusion of the clamp washer 162 from the outboard face 40*a* for enhanced low-profile aesthetics and aerodynamics. By virtue of using less material, this low-profile arrangement also reduces the weight of both the clamp washer 162 and the skewer shaft 152.

In operation, the clamping assembly 178 is operated as follows: As the lever 170 is rotated about the barrel nut 175 and cam axis 181, the cam surface 172 cams against the follower surface 177, causing the follower bushing 176 to be selectively displaced in the axial direction such that the grip face 180 is axially displaceable relative to the barrel nut 175 and to its associated skewer shaft 152. Further, the threaded engagement between the threaded end 154 of the skewer shaft 152 and the cross hole 179 of the clamping assembly 178 may be threadably adjusted to control the axial separation distance 192 between the grip faces 161 and 180. Thus, it may be seen that the quick release skewer assembly 134 has two modes to adjust the axial separation distance 192 between grip faces 161 and 180: (i) the threadable engagement between threaded portion 154 and cross hole 179, and (ii) the camming interface between the cam surface 172 and follower surface 177.

FIG. 3*g* shows the quick release skewer assembly 134 as pre-assembled to the hub assembly 130. Refer to FIGS. 3*j-k* for items described but not otherwise shown in FIGS. 3*a* and FIGS. 3*g-i*. With the clamp washer 162 assembled to the skewer shaft 152, as shown in FIG. 3*d*, the skewer shaft 152 is first passed through the spring 80*a* and then through holes 50*a* and 50*b* such that its threaded portion 154 extends axially outboard of axle stub 48*b*. The spring 80 is assembled over the exposed second end 156 of skewer shaft 152. The clamping assembly 178 is then loosely threaded onto threaded portion 154 of skewer shaft 152 as previously described in FIGS. 3*d* and 3*f*, with the threaded portion 154 threadably engaged with internally threaded cross hole 179. There is preferably a clearance sliding fit between the skewer shaft and holes 50*a* and 50*b* so that the skewer shaft 152 may easily rotate about shaft axis 150 and shift axially relative to the hub assembly 30. The hub assembly 130 is then axially aligned with dropouts 32*a* and 32*b* such that inboard face 38*a* is aligned with outer face 46*a* and inboard face 38*b* is aligned with outer face 46*b*. The lever 170 is moved in direction 182 into the "open" or unclamped position, such that the cam interface between cam surface 172 and follower surface 177 is in the retracted position to provide maximum axial separation between grip faces 161 and 180.

Figure 3H:
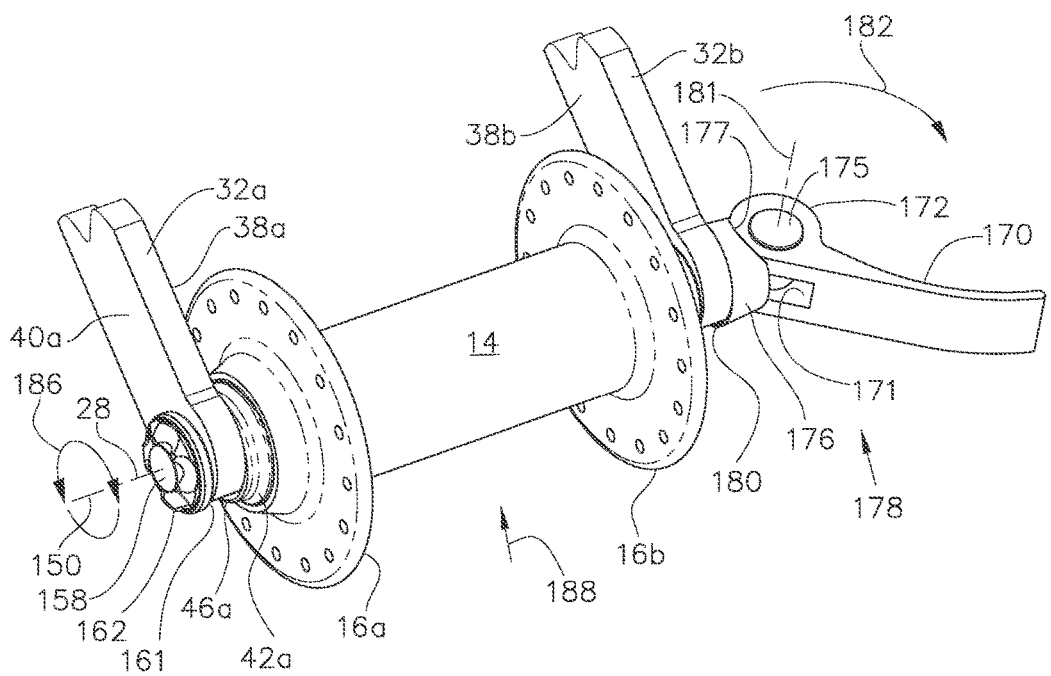

FIG. 3*h* shows the hub assembly 30 as next radially displaced in direction 188 to be pre-assembled and positioned within the dropouts 32*a* and 32*b*. Axle stubs 48*a* and 48*b* are now nested within slots 36*a* and 36*b* respectively to provide radial positioning alignment between the hub assembly 30 and the dropouts 32*a* and 32*b*. Also, inboard faces 38*a* and 38*b* are now loosely contacting outer faces 46*a* and 46*b* respectively. The clamp washer 162 may then be rotated in direction 186 by manually manipulating the configured surface 166, thereby rotating the skewer shaft 152 about shaft axis 150 to selectively adjust the threaded engagement between threaded portion 154 and cross hole 179 such that the axial separation 192 between grip faces 161 and 180 is adjusted and set to the desired dimension. The rotationally keyed engagement between the clamp washer 162 and skewer shaft 152 permits the skewer shaft 152 to rotate with the clamp washer 162 about shaft axis 150. Thus, manipulating and rotating the clamp washer 162 may serve to threadably adjust the engagement between the threaded portion 154 and the cross hole 179. FIG. 3*h* shows the lever 170 still in the "open" position. This threadable adjustment between threaded portion 154 and cross hole 179 is provided to merely adjust the axial separation 192 without applying appreciable clamping pressure to the dropouts 32*a* and 32*b*. As is common with conventional quick release skewer assemblies, this adjustment is merely to provide an axial separation 192 setting such that this axial clamping may subsequently occur when the lever 170 is next pivoted to the "closed" position a shown in FIGS. 3*i* and 3*k*. As such, this threadable adjustment at the second end 156 of the skewer shaft 152 corresponds to the threadable adjustment between the adjusting nut 62 and the first end 56 of the skewer shaft 52 as described in FIG. 2*c*. In contrast to the prior art arrangement of FIGS. 2*a-h*, where the threadable adjustment occurs at the first end 56 of the skewer shaft 52, the threadable adjustment of FIGS. 3*a-k* occurs at the second end 156 of the skewer shaft 152.

Figure 3I:
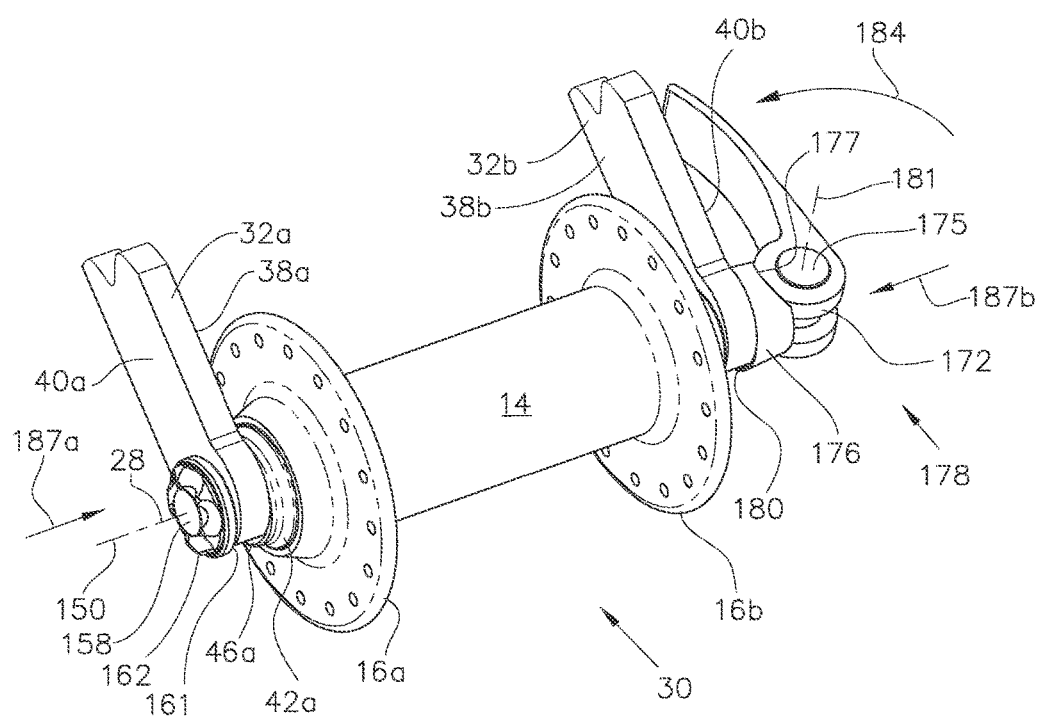
Figure 3J:
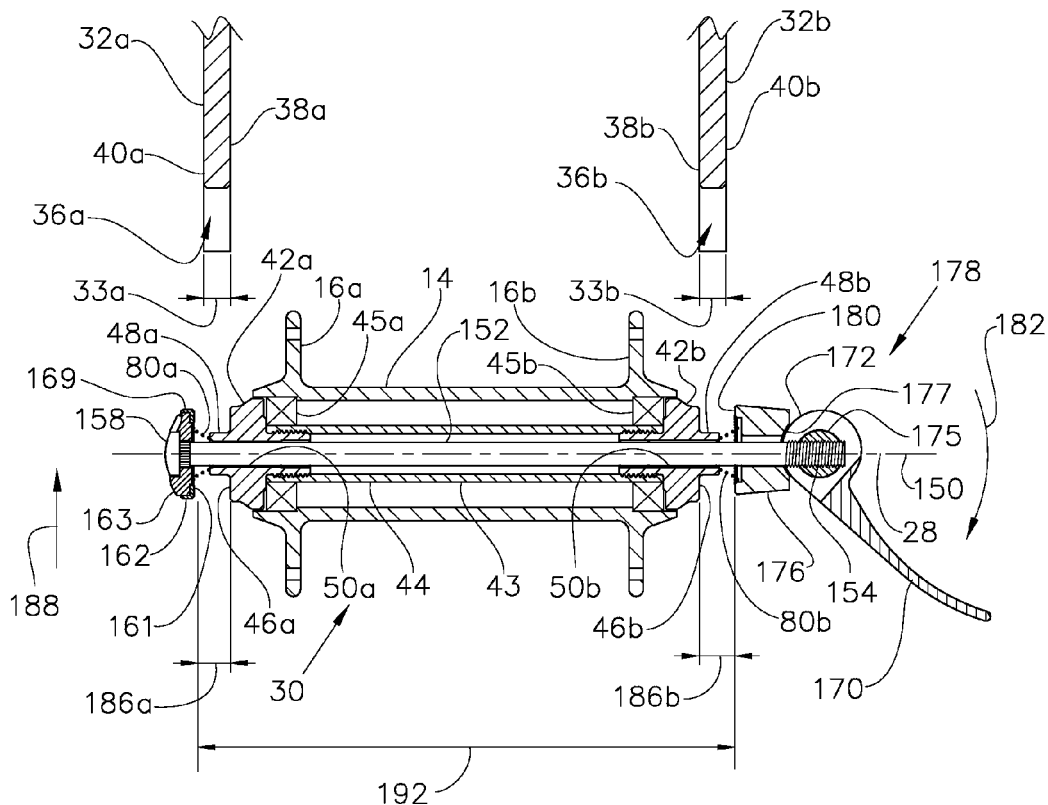
FIG. 3j is cross section view of the embodiment of FIG. 3a taken along 81-81, corresponding to the assembly sequence of FIG. 3g, showing the skewer assembly as pre-assembled to the hub assembly prior to its mounting in the dropouts.
Figure 3K:
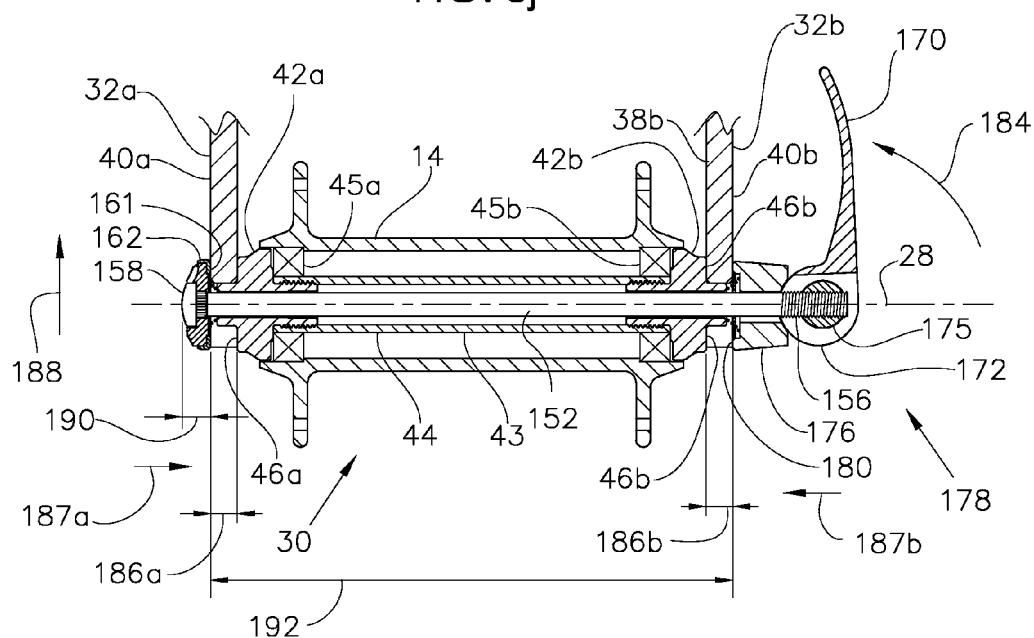
FIG. 3k is cross section view of the embodiment of FIG. 3a taken along 81-81, corresponding to the assembly sequence of FIG. 3i, showing the skewer and hub assemblies of FIG. 3h positioned between the frame dropouts, with the lever moved to the "closed" position to clamp the dropouts.

Next, as shown in FIG. 3*i*, the lever 170 is pivoted in direction 184 into the "closed" or clamped position, such that the cam interface between cam surface 172 and follower surface 177 of the follower bushing 176 is in the extended position to draw grip faces 161 and 180 axially toward each other by means of the skewer shaft 152. Grip face 161 is thereby pressed and clamped against outboard face 40*a*, and inboard face 38*a* is also pressed and clamped against outer face 46*a*. Simultaneously, grip face 180 is now pressed and clamped against outboard face 40*b*, and inboard face 38*b* is also pressed and clamped against outer face 46*b*. Thus, dropout 32*a* is now axially sandwiched and clamped between grip face 161 and outer face 46*a* and dropout 32*b* is now axially sandwiched and clamped between grip face 180 and outer face 46*b*. The hub assembly 30 is now firmly clamped and assembled to both dropouts 32*a* and 32*b*. The skewer shaft 152 serves to connect the clamping assembly 178 to the clamp washer 162 along the shaft axis 150 and is operative to axially link grip faces 180 and 161.

It is noted that, as the lever 170 is moved in direction 184, the interaction between the cam surface 172 and follower surface 177 is a rotary cam interface where the lever 170 pivots about the barrel nut 175 and about pivot axis 181 such that cam surface 172 slides against the follower surface 177 to actuate and linearly displace the follower bushing 176 and grip face 180 in an axially inboard direction toward the grip face 161 and away from the barrel nut 175. The pivot axis 181 is shown here to be generally perpendicular to the shaft axis 150. Alternatively, a wide variety of alternate cam designs may be incorporated into the skewer assembly 134, including linear cam arrangements and alternate rotary cam arrangements, which may include cam arrangements where the pivot axis is not perpendicular to the shaft axis 150 or where the pivot axis may be parallel to the shaft axis 150. There are a variety of mechanisms that may be substituted for the cam mechanism to achieve linear clamping displacement of the grip face 180, such as a rack and pinion mechanism (for example). However, a cam mechanism may be preferable because the axial actuation rate of the grip face may be easily optimized for optimal clamping action. For example, the axial actuation rate may be designed to be variable relative to lever motion, such that the grip face may have faster initial actuation rate to provide maximum linear displacement of the grip face 180, and then transition to slower final actuation rate to provide greater clamping force as the lever approaches the "closed" orientation and as the grip face 180 approaches and contacts the outboard face 40*b*.

As described in FIGS. 3*a-k*, the clamping assembly 178 serves to displace the follower bushing 176 in a generally linear direction along the shaft axis 150. This linear action is highly preferable because it serves to provide clamping without inducing torque or bending in the skewer shaft 152. Further, since the grip face 180 approaches the outer face 40*b* in a direction generally parallel to the axial axis 28 and without appreciable rotation, the grip face 180 will not rotatably grind against the outer face 40*b* or otherwise create rotational wear and/or friction in either surface. Although not a requirement, it is shown that the convex cam surface 172 is nested with the concave follower surface 177, which further insures that the grip face 180 will not rotate about shaft axis 150 relative to the lever 170.

This linear action is in contrast to a threadable clamping, which would rely on rotary action to clamp the dropouts 32*a* and 32*b*, and which would result in the aforementioned rotatable grinding between the grip face and the dropout. An example of such a threadable clamping would be to substitute a nut (not shown) for the clamping assembly 178. In this case, the nut would include a grip face and its internal threads would threadably engage with threaded portion 154. Rotatably tightening the nut and/or the clamp washer 162 would serve to axially clamp the dropouts 32*a* and 32*b*. Such a threadable clamping would also require the skewer shaft to carry an appreciable amount of torque to accommodate this clamping. Since geometry and weight constraints favor a control shaft of smaller cross section, such a threadable clamping could impart additional undesirable torsional stress and torsional deflection on the skewer shaft. Rotatably tightening the clamp washer against the nut induces a high degree of torque to the skewer shaft, while the skewer shaft is commonly only 5 mm in diameter-far too thin to resist the substantial torque required to achieve substantial axial clamping of the dropouts 32*a* and 32*b*. Further, as the nut is tightened against the outboard face 40*b* the grip face will tend to circumferentially grind against the outboard face 40*b*, resulting in a high degree of friction and wear to the components involved, with the additional friction serving to limit the axial clamping force that may be achieved. As such, this threadable clamping arrangement is less preferable as compared to the linear action provided by the clamping assembly 178. This threadable clamping may be considered to be a rotational actuation where the skewer shaft sees an excessive degree of torque during actuation and clamping. Since the skewer shaft 152 is commonly a slender rod of a length on the order of 120 mm and a diameter of approximately 5 mm, it does not have very high torsional stiffness and tends to experience a high degree of torsional shear stress and twisting displacement as this rotationally actuated assembly is tightened to clamp the dropouts. This shear stress and twisting displacement severely limits the achievable clamping force to secure the hub assembly 30 to the dropouts 32a and 32b. In contrast, the linear displacement of the grip face 180 of the present invention does not induce appreciable torque and twisting in the skewer shaft 152 about the shaft axis 150 and this linear displacement is capable of achieving much higher clamping loads to hold the wheel (not shown) more securely to the dropouts 32a and 32b. As such, the cam actuated linear displacement (i.e. linear actuation) of the grip face 180 of FIGS. 3a-k is a highly preferable clamping means in comparison with aforementioned rotational actuation designs FIG. 3j corresponds to the assembly sequence of FIG. 3g and shows the hub assembly 30 and skewer assembly 134 and dropouts 32a and 23b in cross section for further clarity. It is shown that the axle assembly 44 is made up of axlecaps 42a and 42b and tubular axle 43. FIG. 3j illustrates that holes 50a and 50b constitute the exposed openings of a continuous axial hole that extends axially through axlecaps 42a and 42b and tubular axle 43. Hub shell 14 is rotatable about the axle assembly 44 via bearing assemblies 45a and 45b. Dropouts 32a and 32b have axial thickness 33a and 33b respectively. Similarly, gap 186a exists between grip face 161 and outer face 46a and gap 186b exists between grip face 180 and outer face 46b. In this figure, with the lever 170 moved in direction 182 to the "open" position as shown, gaps 186a and 186b are shown in their open and expanded position such that gap 186a is greater than thickness 33a and gap 186b is greater than thickness 33b. The hub assembly 30 and skewer assembly 134 may now be installed in the dropouts in direction 188, with gaps 186a and 186b providing sufficient clearance for radial assembly with dropouts 32a and 32b. Springs 80a and 80b function in the conventional manner and serve to balance gaps 186a and 186b prior to insertion and installation of the preassembly of the hub assembly 30 and skewer assembly 134. It is noted that springs 80a and 80b are included as an optional convenience and the skewer assembly 134 would function properly without them.

FIG. 3k corresponds to the assembly sequence of FIG. 3i and shows the hub assembly 30, skewer assembly 134, and dropouts 32a and 32b in cross section for further clarity. Hub assembly 30 and skewer assembly 134 are moved in the generally radial direction 188 such that axle stubs 48a and 48b are nested within slots 36a and 36b respectively to provide radial positioning alignment between the hub assembly 30 and the dropouts 32a and 32b. The clamp washer 162 may then be rotated about shaft axis 150 to threadably adjust the threaded engagement between the threaded portion 154 and the cross hole 179, thereby adjusting the axial separation 192 to the desired dimension. Lever 170 is next selectively moved in direction 184 into the "closed" position such that cam surface 172 cams against follower surface 177 to displace the follower bushing 176 in direction 187b and the clamp washer 162 in direction 187a (by means of skewer shaft 152) as shown in FIG. 3k. The axial separation 192 is reduced and gaps 186a and 186b are thereby reduced such that grip face 161 is now pressed and axially clamped against outboard face 40a, and inboard face 38a is also pressed and axially clamped against outer face 46a. Simultaneously, grip face 180 is now pressed and axially clamped against outboard face 40b, and inboard face 38b is also pressed and axially clamped against outer face 46b. Thus, dropout 32a is now sandwiched and clamped between grip face 161 and outboard face 40a and dropout 32b is now sandwiched and clamped between grip face 180 and outboard face 40b. The hub assembly 30 is now assembled and solidly secured to dropouts 32a and 32b.

In the prior art arrangement of FIGS. 2a-h, the axial position of the grip face 68 relative to the first end 56 of skewer shaft 52 is threadably adjustable and the axial position of the barrel nut 74 relative to the second end 60 is commonly fixed. In contrast, FIGS. 3a-k shows the axial position of the grip face 161 to be axially fixed or axially limited relative to the first end 160 of skewer shaft 152 and the axial position of the barrel nut 74 is threadably adjustable relative to the second end 156.

The clamp washer 162 is shown to be rotationally keyed or otherwise rotationally engaged to the shank portion 153 of the skewer shaft 152. Thus, when the clamp washer 162 is rotated about the shaft axis 150, via configured surface 166, the skewer shaft 152 is correspondingly rotated to adjust its threaded engagement with the clamping assembly 178. The rotationally keyed engagement described in FIGS. 3a-k, or another means to limit rotation of the clamp washer 162 relative to the skewer shaft 152 about shaft axis 150, is preferred because this allows the threadable engagement between threaded portion 154 and cross hole 179 to be easily controlled and adjusted by means of rotation of the clamp washer 162. In an alternate arrangement, the clamp washer 162 may be rotatable about the shaft axis 150 relative to the skewer shaft 152. In such an arrangement, where the clamp washer 162 may rotate independently of the skewer shaft 152, it may be more difficult to manually manipulate the skewer shaft 152 to effect the threaded adjustment. As such, the independent rotation of the clamp washer relative to the skewer shaft 152 is a less preferable arrangement.

It should be noted that the skewer shaft 152 is placed under a high level of tensile stress during clamping. Also, the skewer shaft 152 may serve as an elastic tensile spring to maintain a desired clamping force between grip faces 161 and 180 to securely clamp the dropouts 32a and 32b. The skewer shaft 152 may stretch slightly during clamping to add a small amount of resiliency to the system and/or to control the axial clamping force. If such a resilience is desired, and to support the high level of tensile stress, it may be preferable that the skewer shaft 152 be of a high strength and relatively stiff material such as steel or titanium material and that the shank portion 153 be sized with a cross section area approximately between 10 and 35 square millimeters to provide the optimal tensile stiffness properties of the skewer shaft 152. It is generally preferable that the shank portion 153 have a circular cross section to be easily rotatable within holes 50a and 50b. It should also be noted that the outside diameters of axle stubs 48a and 48b are shown to be larger than the skewer shaft 152 such that their external surface is radially outboard the external surface of the skewer shaft 152. This provides the radial locating and piloting geometry of the axle stubs 48a and 48b relative to the dropouts 32a and 32b as described, while holes 50a and 50b may still accommodate the optimal cross sectional area of the skewer shaft 152.

Axle stubs 48a and 48b are functional to provide radial locating of the hub assembly 30 relative to the dropouts 32a and 32b while holes 50a and 50b provide clearance for the skewer shaft to freely rotate and axially shuttle therein. This free movement of the skewer shaft 152 allows the skewer assembly 134 to function as intended and, as such, the inclusion of axle stubs 48a and 48b is a preferable arrangement of the present invention. Alternatively, the axle stubs 48a and 48b may be omitted, and instead the exposed portions of the skewer shaft may be utilized to provide radial positioning control with the slots 36a and 36b of dropouts 32a and 32b respectively. However such an arrangement may permit radial contact between the skewer shaft 152 and slots 36a and 36b, which may inhibit free movement of the skewer shaft 152 relative the hub assembly 30 and thereby impede the operation of the skewer assembly 134.

In certain cases, it is preferable that the clamp washer 162 emboss the outboard face 40a upon clamping. In such a case it is preferable to include a separate grip ring 169 as shown here. It may be preferred that this grip ring 169, and its associated grip face 161, be made of steel or other harder material to facilitate this embossing. The grip ring 169 is shown here to be press-fit and thereby retained onto the washer body 163. Of course, if light weight is of greatest importance, the separate grip ring 169 may be eliminated in favor of an aluminum grip face 161 or a grip face 161 of whichever material the parent clamp washer 162 is made of. The grip ring 169 is shown here to be fixedly joined to the clamp washer 162. However, in an alternate arrangement, the grip ring 169 may be rotatable about the shaft axis 150 relative to the clamp washer 162.

Since lighter weight is generally desirable in bicycle applications, it is preferable to make the clamp washer 162 out of aluminum or titanium or other lightweight and high-strength metal. An aluminum washer body 163 is also softer than the preferred steel or titanium skewer shaft 152. This allows the softer washer body 163 to be easily deformed to conform to the configured surface 157 of the skewer shaft 152. The arrangement of FIGS. 3a-k creates a shaft assembly 183 comprising separate skewer shaft 152 and clamp washer 162 elements, which allows these two elements to be made of different materials: a skewer shaft 152 of steel or titanium to maximize strength and resiliency and a washer body 163, primarily of aluminum or magnesium, to minimize the weight of the shaft assembly 183.

Subsequent removal or disassembly of the hub assembly 30 and skewer assembly 134 from the dropouts 32a and 32b is essentially the reverse of the installation procedure just described. The lever 170 is selectively moved back in direction 182 into the "open" or unclamped position, such that the cam interface between cam surface 172 and follower surface 177 moves the follower bushing 176 to a retracted position. Axial separation 192 between grip faces 168 and 178 is thereby expanded. Thus the hub assembly 30 is now released and unclamped from the dropouts 32a and 32b and the hub assembly 30 may now be withdrawn generally radially from the dropouts 32a and 32b in the conventional manner.

It is noted that the clamp washer 162 and skewer shaft 152 may be manually adjusted by gripping the configured surface 166 with the operator's fingers to effect rotation of the clamp washer 162 about the shaft axis 150. This is the preferred arrangement, since no additional tools are required and this manual manipulation more closely resembles the familiar adjustment method employed by conventional skewer assemblies 34, as illustrated in FIGS. 2a-h. Alternatively, the configured surface 166 may be engaged with a wrench or tool to facilitate adjustment. As a further alternative, the external surface of the clamp washer 162 may be smooth and non-configured.

It is noted that axle stubs 48a and 48b are shown as circular cylindrical collars. This allows hub assembly 30 to be easily rotated or aligned about the axial axis 28 relative to slots 36a and 36b respectively. Alternatively, axle stubs 48a and 48b may have a noncircular external portion which may be used to provide a rotatably keyed engagement about the axial axis 28 relative to slots 36a and 36b respectively.

FIGS. 4a-d describe an alternative embodiment relating to the junction between the skewer shaft and the clamp washer. This alternative design may otherwise be substituted for the shaft assembly 183 of the clamp washer 162 and skewer shaft 152 of FIGS. 3a-k. Skewer shaft 102 extends along a shaft axis 100 and includes a shank portion 103, a male threaded portion 104 (not shown) at its second end 106 (not shown) and an enlarged portion 108 with a noncircular hex-shaped profile at its first end 110. Skewer shaft 102 includes a transition surface 105 extending between the shank portion 103 and the enlarged portion 108. Enlarged portion 108 is shown to be noncircular and hex-shaped, a configuration similar to the head of a hex bolt.

Figure 4A:
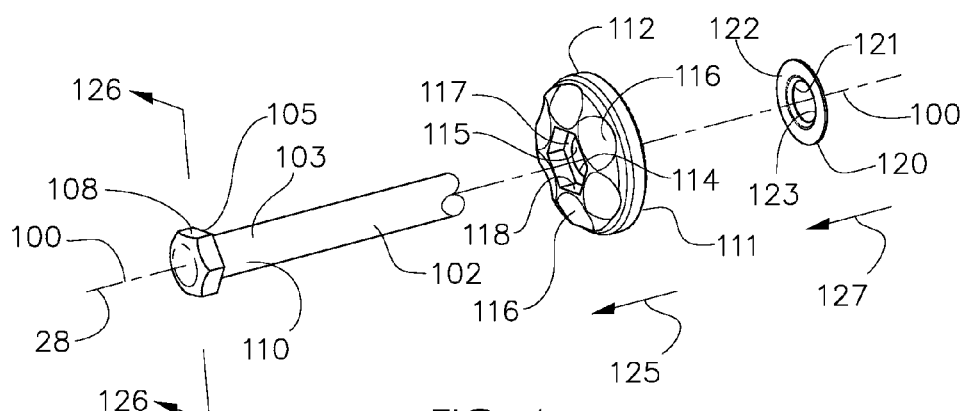
FIGS. 4a-d are views of a second embodiment of the present invention, showing the progressive sequential steps involved in assembling the skewer assembly.
Figure 4B:
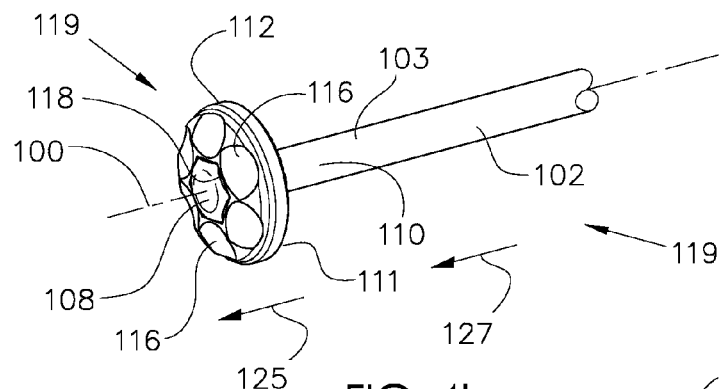
Figure 4C:
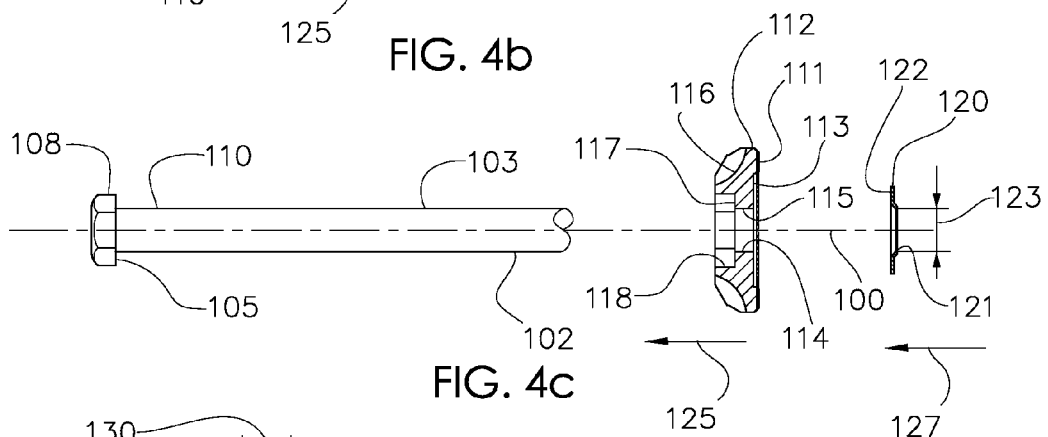

Clamp washer 112 includes a hole 114 therethrough with a hole sidewall 115, an axially inward-facing grip face 111 to bear against the outer face 40a of dropout 32a (not shown), and an inner face 113 (shown in FIG. 4c). Clamp washer 112 also includes a circumferential configured surface 116, which consists of a series of circumferentially alternating recessed surfaces and raised projecting surfaces around its perimeter to facilitate its manual manipulation. Clamp washer 112 also includes a noncircular hex-shaped counterbore 118 and a radially extending step face 117 adjacent the hole 114. In contrast to the embodiment of FIGS. 3a-k, the clamp washer 112 is shown to be a one-piece design that includes the grip face 111. Retainer 120 is of a type that is well known in industry and is commonly referred to as a Tinnerman®-type retainer. Retainer 120 includes a hole 121 of diameter 123 therethrough and a face 122.

Figure 4D:
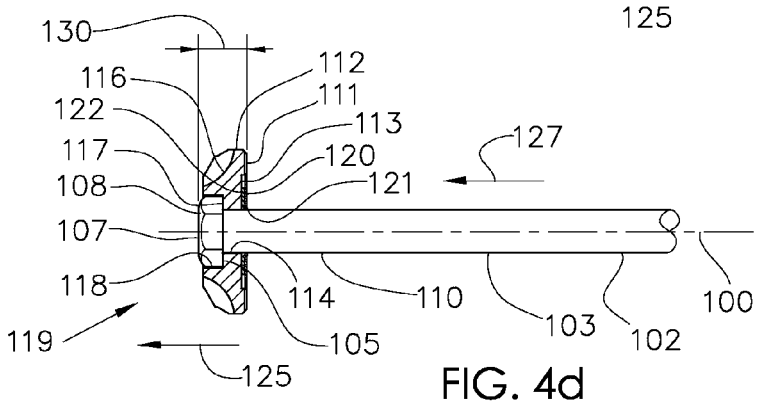

FIGS. 4a and 4c shows these components in exploded view. The clamp washer 112 is assembled over the skewer shaft 102 in direction 125, with shank portion 103 threaded through hole 114 until the transition surface 105 abuts the step face 117, with the shank portion 103 extending through the hole 114. Enlarged portion 108 is nested within counterbore 118, with noncircular hex perimeter profile of the enlarged portion 108 fitted within the matched hex profile of the counterbore 118, thus creating a rotationally keyed engagement (about the shaft axis 100) between the enlarged portion 108 of the skewer shaft 102 and the counterbore 118 of the clamp washer 112. Finally, the retainer 120 is assembled over the skewer shank portion 103 in direction 127 until the face 122 abuts the inner face 113, with the shank portion 103 extending through the hole 121. FIGS. 4b and 4d show the clamp washer 112 and retainer 120 assembled to the skewer shaft 102 as described to create shaft assembly 119. The inside diameter 123 of hole 121 is sized to have an elastic interference fit to grip the shank portion 103 in a gripping engagement upon assembly as shown. The retainer 120 serves to axially retain the clamp washer 112 to the skewer shaft 102 and maintain the nested and rotationally keyed engagement between the enlarged portion 108 and counterbore 118. In comparison with the larger axial width 90 of FIGS. 2a-h, skewer assembly 119 may have a reduced overall axial width 130 between the grip face 111 and the axially outward terminus 107 of the skewer assembly 119. This resulting shaft assembly 119 may be substituted for the shaft assembly 183 of FIG. 3a-k to provide similar function. Manually rotating the clamp washer 112 by means of configured surface 116 will also rotate the skewer shaft 102 about shaft axis 100 to provide threadable adjustment with the clamp assembly 178. It is envisioned that the skewer shaft 102 may be made of a high-strength material such as titanium or steel, while the clamp washer 112 may be made of a lightweight material such as aluminum. It is preferable that the retainer 120 be made of steel that may adequately grip the skewer shaft 102.

The overlie engagement between transition surface 105 and step face 117 is preferably a robust engagement that serves to limit the axially outward movement of the clamp washer 112 relative to the skewer shaft 152 and to resist the clamping forces provided by the clamping assembly 178. Additionally, the retainer 120 serves to limit the axially inward movement of the clamp washer 112 relative to the skewer shaft 102 and also to maintain the rotationally keyed engagement between the counterbore 118 and the enlarged portion 108. Since this axially inward force on the clamp washer 112 may be comparatively lower than the axially outward force, the retainer may not need to provide as robust a connection and may be included in the shaft assembly 118 merely as a convenience to prevent the clamp washer 112 from inadvertently sliding axially inwardly relative to the skewer shaft 102. Omission of the retainer 120 in the shaft assembly 119 would not preclude proper functioning of the corresponding skewer assembly.

In contrast to the two-piece clamp washer 162 of FIGS. 3a-k, clamp washer 112 is shown as a single-piece element that includes the grip face 111. It is noted that the clamp washer 112 is rotationally keyed to the enlarged portion 108 in a region axially outboard of the axially abutting overlie engagement between the transition surface 105 and the step face 117. In contrast, the embodiment of FIGS. 3a-k describes an arrangement where the clamp washer 162 is rotationally keyed to the shank portion 153 in a region axially inboard of the axially abutting overlie engagement between the transition surface 155 and the step face 167. The embodiment of FIGS. 4a-d is representative of a shaft assembly 119 arrangement that includes a retaining means (i.e. retainer 120) to retain the clamp washer 112 to the skewer shaft 102.

Figure 4E:
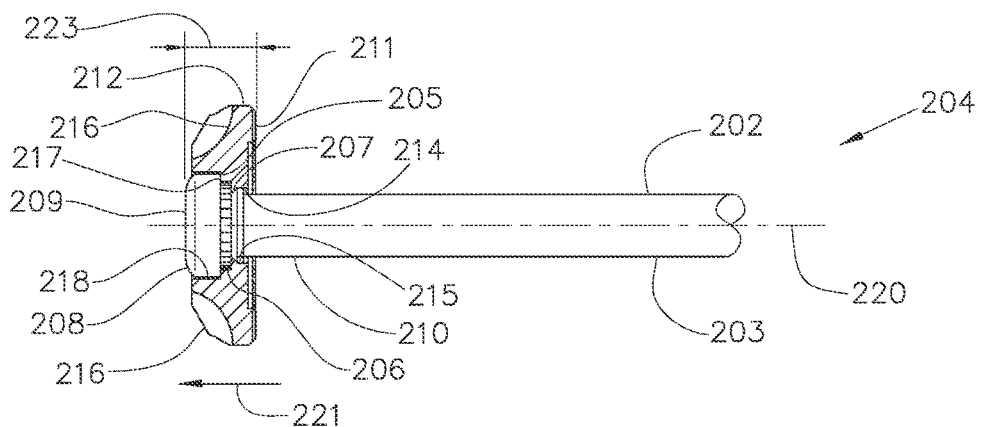
FIG. 4e is a partial cross section view of a third embodiment of the present invention and corresponding to the assembly sequence shown in FIG. 4b, including a self-clinched assembly between the clamp washer and the skewer shaft.

FIGS. 4e-j describe a series of alternative shaft assembly arrangements that may each be substituted for the shaft assembly 183 of FIGS. 3a-k. FIG. 4e describes a self-clinching engagement where the clamp washer 212 is clinched to the skewer shaft 202. The view of FIG. 4e corresponds to the view of FIG. 3f. The skewer shaft 202 extends axially along shaft axis 220 and includes geometry that mimics the PEM® self-clinching panel fastener, a fastener-type well known in industry. The skewer shaft 202 includes an enlarged portion 208, a shank portion 203, a transition surface 205, a configured ridge 206, and a circumferential undercut 207. The configured ridge 206 is knurled to include a series of circumferentially spaced projections that extend radially outwardly and are alternated with circumferentially adjacent recesses therebetween to create a noncircular profile about the shaft axis 220. These projections also extend axially inwardly from the transition surface 205. Clamp washer 212 includes a circumferentially configured surface 216 for manual manipulation, a grip face 211, a hole 214 therethrough with hole sidewall 215, and a counterbore 218 with step face 217.

The clamp washer 212 is assembled over the second end (not shown) of the skewer shaft 202 in direction 221 until the configured ridge 206 contacts the step face 217, with shank portion 203 extending through hole 214. At this initial pre-assembly step, the configured ridge 206 is axially abutting the step face 217, with undercut 207 axially overlapping hole 215. The clamp washer 212 is then further forcibly pressed in direction 221 relative to the skewer shaft 202 until the step face 217 contacts the transition surface 205 such that the configured ridge 206 is thereby embossed into the step face 217, which serves to forge and displace some of the material of the clamp washer 212 into the undercut 207. A deformably clinched engagement between the skewer shaft 202 and the clamp washer 212 is thus achieved.

The clamp washer 212 is pressed in direction 221 until the transition surface 205 abuts the step face 217. The clamp washer 212 is now locked to the skewer shaft 202 in three directions: Firstly, the overlie engagement between transition surface 205 and step face 217 is preferably a robust engagement that serves to limit the axially outward movement of the clamp washer 212 relative to the skewer shaft 202 and to resist the clamping forces provided by the clamping assembly 178 (not shown); Secondly, with the material of the clamp washer 212 pushed and displaced into the undercut 207, the clamp washer 212 becomes axially retained to the skewer shaft 202 to limit the axially inward movement of the clamp washer 212 relative to the skewer shaft 202; Thirdly, since the configured ridge 206 is noncircular about shaft axis 204, its plastically embossed imprint on the step face 217 has a matched noncircular profile, thus providing a rotationally keyed engagement (about shaft axis 220) between the clamp washer 212 and the skewer shaft 202. These interactions are identical to self-clinching panel fasteners that are well known in industry. The clamp washer 212 is thus joined to the skewer shaft 202 to create a self-clinched shaft assembly 204. It is preferable that the skewer shaft 202 be made of a harder and stronger material such as titanium or steel, while the clamp washer 212 may be made of a softer and lightweight material such as aluminum. The difference in hardness insures that the softer clamp washer 212 is plastically deformed by the harder skewer shaft 202 in the self-clinching engagement described hereinabove. Skewer assembly 204 has an axial width 223 between the grip face 211 and the axially outward terminus 209 of the skewer assembly 204. This shaft assembly 204 may be substituted for the shaft assembly 183 of FIGS. 3a-k to provide similar function. Manually rotating the clamp washer 212 by means of configured surface 216 will also rotate the skewer shaft 202 about shaft axis 220 to provide threadable adjustment with the clamp assembly 178 (not shown).

Figure 4F:
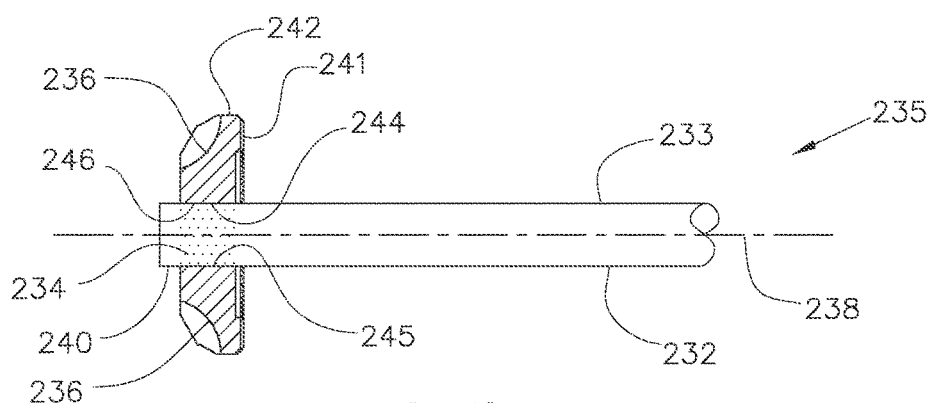
FIG. 4f is a partial cross section view of a fourth embodiment of the present invention and corresponding to the assembly sequence shown in FIG. 4b, including an integral joinder between the clamp washer and the skewer shaft.

FIG. 4f describes a shaft assembly 235 whereby the clamp washer 242 is integrally joined to the skewer shaft 232 as defined herein. The view of FIG. 4f corresponds to the view of FIG. 3f. The skewer shaft 232 extends axially along shaft axis 238 and includes a shank portion 233, a first end 240, and an external surface 234. Clamp washer 242 includes a circumferentially configured surface 236 for manual manipulation, a grip face 241, and a hole 244 therethrough with hole sidewall 245. The clamp washer 242 is assembled to the skewer shaft 232 with shank portion 233 extending through hole 244 as shown, with joining interface 246 between the external surface 234 and the hole sidewall 245. The clamp washer 242 is then joined to the skewer shaft 232 by heating the shaft assembly 235 and flowing brazing material into the joining interface 246. Upon subsequent cooling of the shaft assembly 235, and solidification of the brazing material, the clamp washer 242 is solidly brazed and joined to the skewer shaft 232 to create an integrally joined shaft assembly 235. Alternatively, adhesive may be substituted for the brazing material such that the clamp washer 242 is adhesively joined to the skewer shaft 232 in an integral joinder. As a further alternative, the skewer shaft 232 may be welded to the clamp washer 242 to create an integrally welded assembly. FIGS. 3*a-k* and 4*a-d* show a mechanically keyed engagement between corresponding clamp washer and skewer shaft, to link rotation of the clamp washer with rotation of the skewer shaft about the shaft axis and to restrict independent rotation therebetween. In contrast, FIG. 4*f* shows that this rotational engagement may be achieved by means of an integral joinder. As a further alternative, there may be an interference fit, such as a press fit or a shrink fit, between the skewer shaft 232 and the hole 244 such that the clamp washer 242 and/or the skewer shaft 232 may cause these two parts to elastically squeeze each other resulting in a frictional joinder at joining interface 246 and a rotational coupling therebetween. This shaft assembly 235 may be substituted for the shaft assembly 183 of FIGS. 3*a-k* to provide similar function. Manually rotating the clamp washer 242 by means of configured surface 236 will also rotate the skewer shaft 232 about shaft axis 238 to provide threadable adjustment with the clamp assembly 178.

Figure 4G:
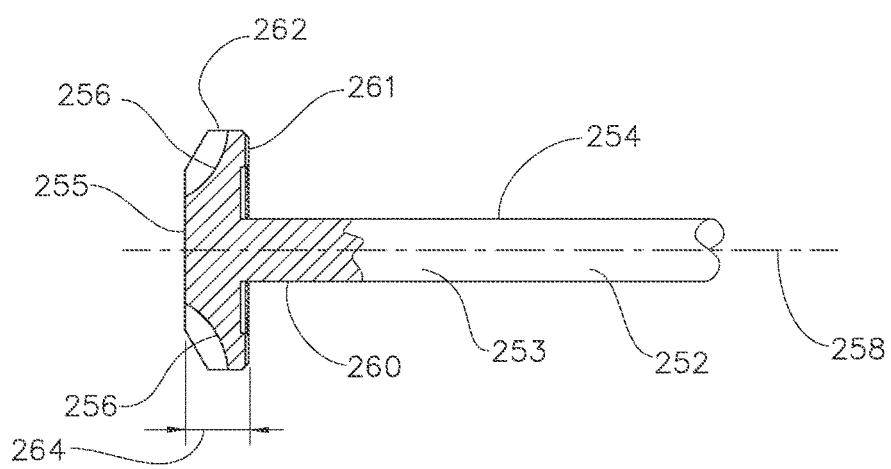
FIG. 4g is a partial cross section view of a fifth embodiment of the present invention and corresponding to the assembly sequence shown in FIG. 4b, including the unitary and monolithic combination of the clamp washer and the skewer shaft.

FIG. 4*g* describes a singular shaft element 254 that combines a clamp head portion 262 and a skewer shaft portion 252 into a single unitary and monolithic element. The view of FIG. 4*g* corresponds to the view of FIG. 3*f*. The skewer shaft portion 252 includes a shank portion 253 extending along shaft axis 258, and a first end 260. The clamp head portion 262 corresponds to the clamp washer 162 of FIGS. 3*a-k* and includes a circumferentially configured surface 256 for manual manipulation and a grip face 261. By virtue of the shaft element 254 being a singular element, the skewer shaft portion 252 is axially and rotationally locked to the clamp washer portion 262. Shaft element 254 has an axial width 264 between the grip face 261 and the axially outward terminus 255 of the shaft element 254. The shaft element 254 may be substituted for the shaft assembly 183 of FIGS. 3*a-k* to provide similar function. Manually rotating the clamping head portion 262 by means of configured surface 256 will also rotate the skewer shaft portion 252 about shaft axis 258 to provide threadable adjustment with the clamp assembly 178.

Figure 4H:
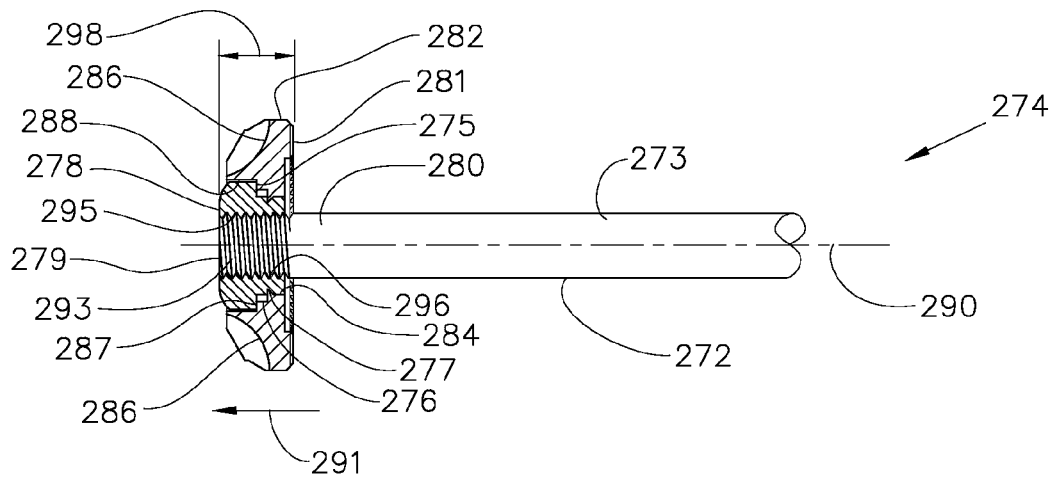
FIG. 4h is a partial cross section view of a sixth embodiment of the present invention and corresponding to the assembly sequence shown in FIG. 4b, including an intermediate connecting element between the clamp washer and the skewer shaft.

FIG. 4*h* is similar to the embodiment of FIG. 4*e*, however, while FIG. 4*e* shows the skewer shaft 202 as combining the enlarged portion 208 and shank portion 203 as a single monolithic element, FIG. 4*h* shows a connection insert 278 as a separate element from the skewer shaft 272. Shaft assembly 274 includes skewer shaft 272, connection insert 278, and clamp washer 282. Skewer shaft 272 includes a shank portion 273 extending along a shaft axis 290, including a first end 280 with external threads 293. Connection insert 278 includes a transition surface 275, a configured ridge 276, and a circumferential undercut 277. Connection insert 278 also includes an internally threaded hole 295 with internal threads 296. Clamp washer 282 is similar to clamp washer 212 of FIG. 4*e* and includes a circumferentially configured surface 286 for manual manipulation, a grip face 281, a hole 284 therethrough, and a counterbore 288 with step face 287.

The connection insert 278 is first threadably assembled to the skewer shaft 272, with external threads 293 threadably engaged to internal threads 296. It is preferable to then lock this threaded assembly by a wide range of means, including: use of adhesive threadlocker at the thread interface, flowing molten brass (i.e. brazing) or other flowable medium into the thread interface, peening or otherwise deforming the threads, inclusion of mechanical fastener(s) to rotationally lock the assembly, or any other locking means known in industry. Since the axial length of this thread engagement is preferably minimized to achieve a minimal axial width 298, the addition of a high strength flowable medium may also serve to fortify this threaded connection. While it is understood that such thread locking is not necessary for proper function of the shaft assembly 274, this thread locking provides a convenience to insure that threadable adjustment (of the axial separation 192, as shown in FIGS. 3*h* and 3*j*) occurs at a threaded interface between the skewer shaft 272 and the clamping assembly 178 (not shown). If threadable adjustment of the axial separation 192 occurs in both of these threaded interfaces, then it is much more difficult for the operator to control the degree of thread engagement in each interface and the ease-of-use and reliability of the assembly may be compromised.

The clamp washer 282 is next assembled to the connection insert 278 in direction 291 until the step face 287 contacts the transition surface 275, with shank portion 273 extending through hole 284. At this initial pre-assembly step, the configured ridge 276 is axially abutting the step face 287, with undercut 277 axially overlapping hole 284. The clamp washer 282 is then further forcibly pressed in direction 291 relative to the connection insert 278 such that the geometry of the configured ridge 276 is thereby embossed into the step face 287, which serves to plastically forge and displace some of the material of the clamp washer 282 into the undercut 277. A deformably clinched engagement between the connection insert 278 and the clamp washer 282 is thus achieved. The clamp washer 282 is pressed in direction 291 until the transition surface 275 abuts the step face 287. The clamp washer 282 is now locked to the connection insert 278 in three directions: Firstly, the overlie engagement between transition surface 275 and step face 287 is preferably a robust engagement that serves to limit the axially outward movement of the clamp washer 282 relative to the connection insert 278 and to resist the clamping forces provided by the clamping assembly 178 (not shown); Secondly, with the material of the clamp washer 282 pushed and displaced into the undercut 277, the clamp washer 282 becomes axially retained to the connection insert 278 to limit the axially inward movement of the clamp washer 282 relative to the connection insert 278; Thirdly, since the configured ridge 276 is noncircular, its embossed imprint on the step face 287 has a matched noncircular profile, thus providing a rotationally keyed engagement (about shaft axis 290) between the clamp washer 282 and the connection insert 278. With the locked threaded engagement between external threads 293 and internal threads 296, the connection insert 278 is also locked to the skewer shaft 272 in the axially inward direction, the axially outward direction, and the rotational direction about shaft axis 290. The connection insert 278 is similar to self-clinching panel fasteners that are well known in industry. The clamp washer 282 is thus rotationally engaged and joined to the skewer shaft 272 through an intermediate connecting element (i.e. connection insert 278) to create shaft assembly 274, with the skewer shaft 272 joined to the connection insert 278 and the connection insert 278 joined to the clamp washer 282. This shaft assembly 274 may be substituted for the shaft assembly 183 of FIGS. 3*a-k* to provide similar function. Skewer assembly 274 has an axial width 298 between the grip face 281 and the axially outward terminus 279 of the skewer assembly 274. Manually rotating the clamp washer 282 by means of configured surface 286 will also rotate the skewer shaft 272 about shaft axis 290 to provide threadable adjustment with the clamp assembly 178.

Figure 4I:
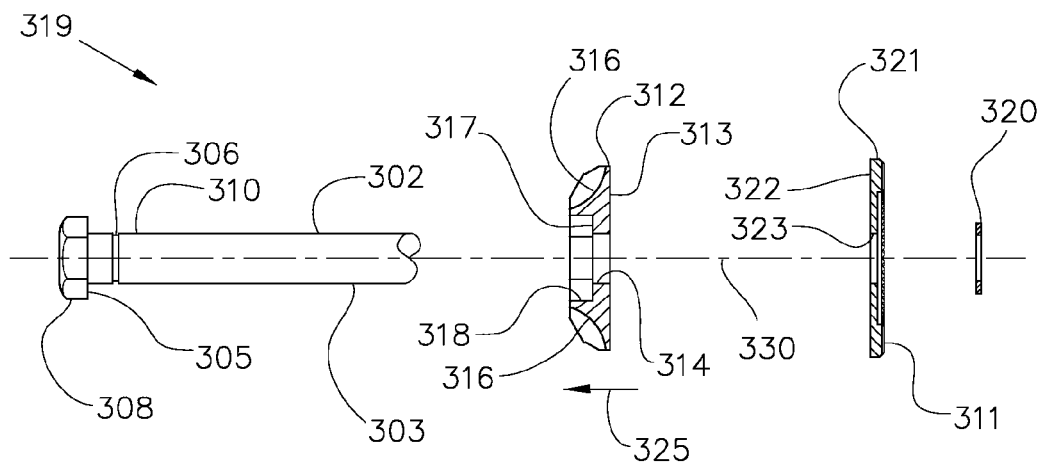
FIG. 4i is a partial cross section view of a seventh embodiment of the present invention and corresponding to the assembly sequence shown in FIG. 4c, shown prior to the assembly of the clamp washer, the grip washer, and the snapring retainer.
Figure 4J:
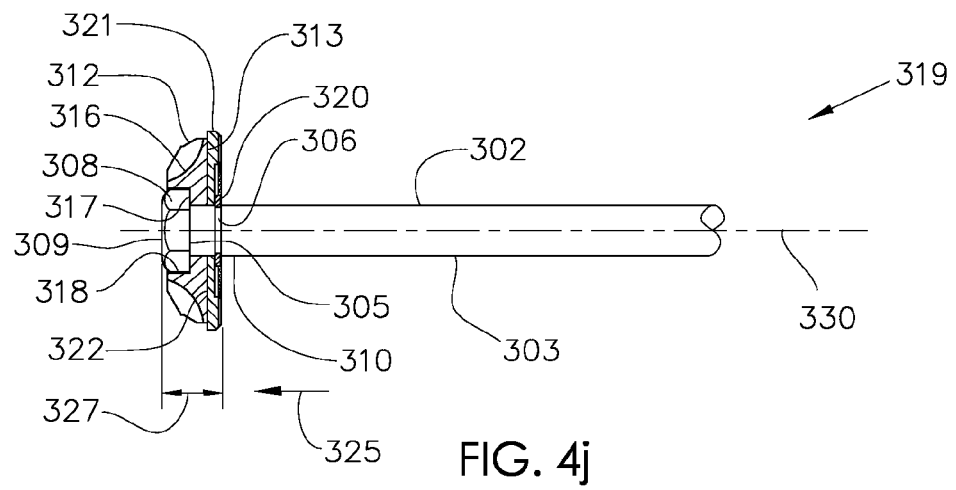
FIG. 4j is a partial cross section view of the embodiment of FIG. 4i and corresponding to the assembly sequence shown in FIG. 4d, showing the assembled skewer shaft, clamp washer, grip washer, and snapring retainer.

FIGS. 4i and 4j describe an alternate embodiment with a grip face 311 that is rotatable relative to the clamp washer 312. This alternative design may otherwise be substituted for the clamp washer 162 and skewer shaft 152 of FIGS. 3a-k. As shown in FIG. 4i, skewer shaft 302 extends along a shaft axis 330 and includes a shank portion 303, a snapring groove 306, a male threaded portion (not shown) at its second end (not shown) and an enlarged portion 308 with a hex-shaped noncircular profile at its first end 310. Skewer shaft 302 also includes a transition surface 305 extending between the shank portion 303 and the enlarged portion 308. Enlarged portion 308 is shown to be noncircular and hex-shaped, a configuration similar to the head of a hex bolt.

Clamp washer 312 includes a hole 314 therethrough, an axially inward-facing inner face 313. Clamp washer 312 also includes a circumferential configured surface 316, which consists of a series of circumferentially alternating recessed surfaces and raised surfaces around its perimeter to facilitate its manual manipulation. Additionally, clamp washer 312 includes a noncircular hex-shaped recess or counterbore 318 and a radially extending step face 317 adjacent to a central hole 314. Grip washer 321 includes outer face 322, grip face 311, and central hole 323 therethrough. Central hole 323 is sized to have a clearance fit with the shank portion 303. Snapring 320 is representative of a wide variety of convention split snaprings that are well known in industry and serve as a retainer that nests within a snapring groove (i.e. snapring groove) 306 of a shaft (i.e. skewer shaft 302).

FIG. 4i shows these components unassembled and in exploded view. Next, the clamp washer 312 is then assembled over the skewer shaft 302 in direction 325, with shank portion 303 threaded through hole 314 until the transition surface 305 abuts the step face 317 and with the shank portion 303 extending through the hole 314. Enlarged portion 308 is nested within counterbore 318, with noncircular hex profile of the enlarged portion 308 fitted within the matched hex profile of the counterbore 318, thus resulting in a rotationally keyed engagement (about the shaft axis 330) between the noncircular enlarged portion 308 of the skewer shaft 302 and the noncircular counterbore 318 of the clamp washer 312. The engagement between enlarged portion 308 and counterbore 318 is identical to the engagement between enlarged portion 108 and counterbore 118 of FIGS. 4a-d. Next, the grip washer 321 is then assembled over the skewer shaft 302 in direction 325, with shank portion 303 threaded through hole 323 until the outer face 322 abuts the inner face 313, with the shank portion 303 extending through the hole 323. Finally, the snapring 320 is assembled over the skewer shank 303 in direction 325 and elastically snapped into snapring groove 306 in the conventional manner to axially retain both the clamp washer 312 and grip washer 321 to the skewer shaft 302 and to maintain the rotational engagement between enlarged portion 308 and the counterbore 318.

FIG. 4j show the clamp washer 312, grip washer 321, and snapring 320 assembled to the skewer shaft 302 as described, with snapring 320 elastically nested within snapring groove 306 to create shaft assembly 319. Shaft assembly 319 has an axial width 327 between the grip face 311 and the axially outboard terminus 309 of the shaft assembly 319. As shown here, the grip washer 321 is not rotationally keyed to the skewer shaft 302 or the clamp washer 312 and thus may rotate independently from clamp washer 312 about shaft axis 330. This resulting shaft assembly 319 may be substituted for the shaft assembly 183 of FIG. 3a-k to provide similar function. Manually rotating the clamp washer 312 by means of configured surface 316 will also rotate the skewer shaft 302 about shaft axis 330 to provide threadable adjustment with the clamp assembly 178 (not shown). The snapring 320 is retained to the snapring groove 306 in a radially extending overlie engagement to limit axially inboard movement of the snapring 320 relative to the skewer shaft 302. The axially retained interaction between the clamp washer 321 and skewer shaft 302 is generally identical to the interaction between clamp washer 112 and skewer shaft 102 as described in FIGS. 4a-d, with snapring 320 substituted for retainer 120 to provide axial retaining means. When rotating the skewer shaft 302 (preferably by means of clamp washer 312), the grip face 311 may inadvertently contact and rotationally snag the outer face 40a of the dropout 32a (not shown). Since the grip washer 321 is capable of rotating independently from skewer shaft 302, this allows the clamp washer 312 to be smoothly rotated about shaft axis 330 while grip washer 321 remains rotationally snagged to the dropout 32a, thus providing a convenience when threadably adjusting the skewer shaft 302 relative to the clamping assembly 178 (not shown) as described hereinabove.

Figure 5:
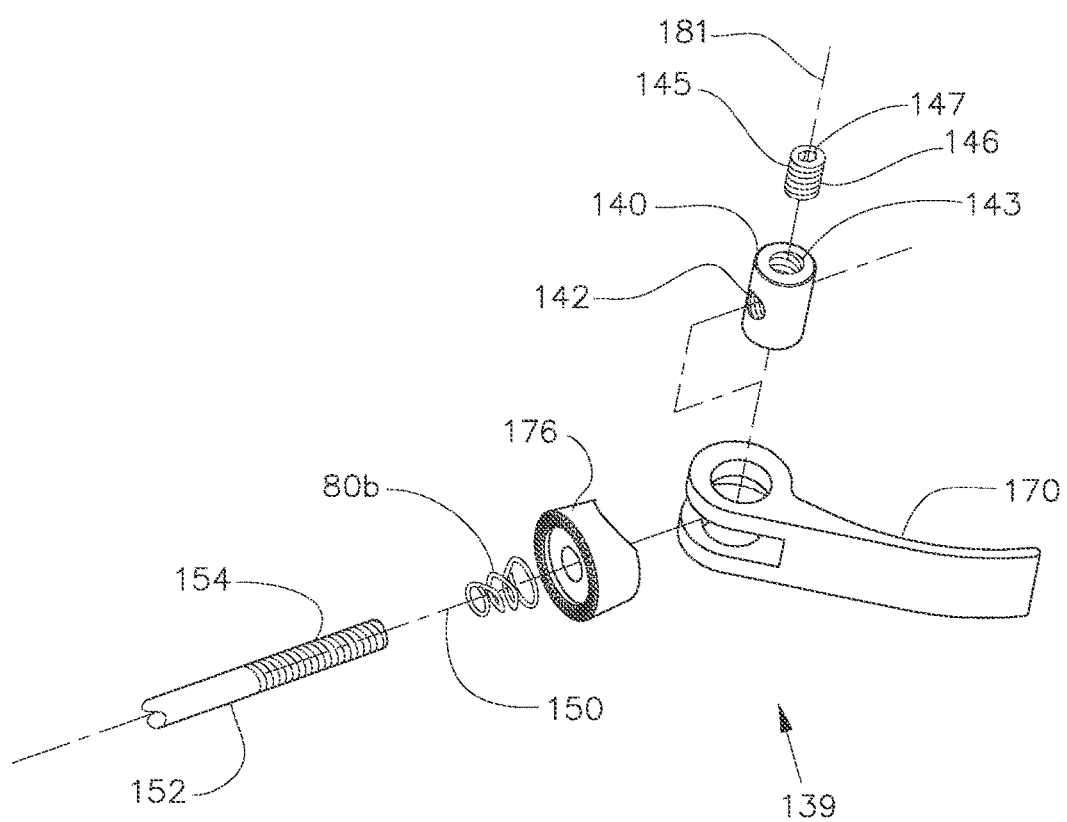
FIG. 5 is a partial exploded view of an alternate arrangement associated with the second embodiment of the present invention, corresponding to the view of FIG. 3a and including a set screw as a means to lock the threadable adjustment between the skewer shaft and the barrel nut of the clamping assembly.

FIG. 5 describes an embodiment of a clamping assembly 139 that is identical to clamping assembly 178 in all respects with the exception that the barrel nut includes an internally threaded hole 143 to accept a set screw 145. Skewer shaft 152, clamp washer 162, spring 80b, follower bushing 176, and lever 170 are all identical in form and function to those shown in FIGS. 3a-k. Barrel nut 140 is a generally circular cylindrical element about pivot axis 181 and serves as a pivot pin for the lever 170. Barrel nut 140 includes an internally threaded cross hole 142 extending therethrough and perpendicular to pivot axis 181. Barrel nut 140 also includes an internally threaded hole 143 that extends perpendicular to shaft axis 150 and pierces cross hole 142. Set screw 145 is of conventional design and includes external threads 146 and a hex socket 147.

Clamping assembly 139 is assembled as described in FIGS. 3a-k, with the substitution of barrel nut 140 for barrel nut 175. The threadable engagement between the external threads of threaded portion 154 and internal threads of cross hole 142 is adjusted to control the axial separation 192 between grip faces 161 prior to final clamping of the clamping assembly 139 as described in FIGS. 3h and 3j. When this desired axial separation 192 is achieved, the set screw 145 is threadably assembled to hole 143, with external threads 146 threadably engaged to internal threads of hole 143. A hex key (not shown) may be engaged to hex socket 147 to manipulate the set screw 145. As the set screw 145 is threadably tightened, it binds against the skewer shaft 152, thus preventing any further threaded adjustment and locking the threaded engagement between threaded portion 154 and cross hole 142 to prevent further adjustment and/or to prevent inadvertent loosening of this threaded engagement. This binding of the set screw 145 with the skewer shaft 152 is representative of a variety of alternate means to lock the threaded adjustment between skewer shaft 152 and clamping assembly 139 to control the axial separation 192 distance as described in FIG. 3h.

While my above description contains many specificities, these should not be construed as limitations on the scope of the invention, but rather as exemplifications of embodiments thereof. For example:

The clamp washers described herein are shown to include a configured surface that consists of a series of circumferentially spaced indents and ridges that are designed to be manually rotated and manipulated with the operator's fingers. Primarily, this manipulation will serve to threadably adjust the threaded engagement between the skewer shaft and the clamping assembly to selectively vary the axial separation of the opposing grip faces in an adjustment sequence well known to users of conventional quick release skewers. The configured surfaces 116, 166, 216, 236, and 256 are merely representative of a wide range of geometry options to facilitate manipulation of the corresponding skewer shaft. Alternatively, the configured surface may have a variety of forms, including a knurled surface or a lever projection for manual manipulation or wrench flats for manipulation with a wrench or key. However, it is also noted that this configured surface is merely provided as a convenience for the operator. As a still further alternative, the clamp washer may instead have a smooth, circular or otherwise non-configured, surface for enhanced aerodynamics.

The clamping assembly 178 described herein is of a generally conventional configuration and includes a cross-drilled and threaded barrel nut. This clamping assembly 178 is disclosed herein to provide a representative example of a means to provide a linear clamping action to the skewer assembly. However, it is understood that this clamping assembly 178 is merely representative of a wide range of possible clamping assemblies that may alternatively be utilized. In the bicycle industry, there presently exists several alternative clamping assembly configurations that may be easily adapted to the present invention. Further, a wide range of mechanisms may be utilized to provide the linear clamping action preferred in the present invention.

The embodiment of FIGS. 3*a*-*k* describe a two-piece clamp washer 162 where the grip face 161 is in a grip ring 169 that is connected to a washer body 163, whereas FIGS. 4*a*-*d* shows a one-piece clamp washer 112. It is understood that the overall shaft assembly may alternatively include a wide range of configurations and elements as long as these configurations include a grip face portion and a shaft portion.

All of the embodiments shown herein describe the clamp washer portion as solidly and fixedly anchored to the skewer shaft portion to resist axially outward movement of the clamp washer relative to the skewer shaft. This is to support the clamping forces induced by the clamping assembly. These embodiments also show a means to retain the clamp washer to the skewer shaft to resist axially inward movement of the clamp washer relative to the skewer shaft. This axially inward retaining is preferable as it serves to keep these two portions from separating inadvertently and to maintain the rotationally keyed engagement between the skewer shaft and the clamp washer. However, it is understood that this retaining is not required for proper function of the shaft assembly and the shaft assembly may alternatively lack a retaining means to resist the axially inward movement of the clamp washer relative to the skewer shaft.

The embodiments show a threadably adjustable engagement between the skewer shaft and the clamping assembly to selectively control the axial spacing of opposing grip faces of the quick release assembly. Alternatively, the clamping assembly may be axially fixed to the skewer shaft, with no provision for threadable adjustment. In such a case, the axial spacing of opposing grip faces may potentially have no axial adjustment and clamping would be solely achieved by the clamping action of the clamping assembly. In a further alternative, the skewer shaft may first be threadably adjusted with the clamping assembly to achieve the optimal axial spacing of opposing grip faces and then the axial position of the skewer shaft may be subsequently axially locked to the clamping assembly to maintain this optimal adjustment without concern that this adjustment will inadvertently become misadjusted.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A quick release skewer assembly, comprising:
    a skewer shaft extending along a shaft axis and including a first end portion thereof and a second end portion thereof axially spaced from said first end portion;
    a first clamping element adjacent said first end portion and rotatably linked to said skewer shaft to limit the rotational displacement of said first clamping element with respect to said skewer shaft about said shaft axis, and including a first grip face thereof oriented to face in a generally axially inwardly direction;
    a clamping assembly adjacent said second end portion including an anchor element and a second clamping element;
    wherein said second clamping element includes a second grip face thereof oriented to face in a generally axially inwardly direction axially opposed and facing said first grip face;
    wherein said first grip face is axially separated from said second grip face by a grip distance along said shaft axis;
    wherein said first clamping element has an axial engagement with said skewer shaft to limit axially outward displacement of said first grip face with respect to said skewer shaft;
    wherein said second anchor element is threadably connected to said skewer shaft such that said grip distance may be selectively threadably adjusted by means of said threadable connection; and
    wherein said clamping assembly is operative to selectively displace said second grip face relative to said anchor element in a generally linear and axial direction between: (i) an open orientation wherein said grip distance is axially expanded; and (ii) a closed orientation wherein said grip distance is axially contracted such that said first grip face and said second grip face are axially proximal to each other relative to said open orientation.

2. A quick release skewer assembly according to claim 1, including a hub assembly comprising:
    a stationary axle element including an axial axis, a first outer face and a second outer face axially spaced and opposed to said first outer face, and including an axially extending axle opening therethrough that extends between said first outer face and said second outer face;
    a rotatable hub shell element that is rotatable about said axle element;
    wherein said first grip face is axially outboard said first outer face and said second grip face is axially outboard said second outer face; and
    wherein said skewer shaft extends through said axle opening.

3. A quick release skewer assembly according to claim 2, wherein said first outer face includes a first axle stub extending axially outwardly therefrom, and wherein said axle opening extends through said first axle stub.

4. A quick release skewer assembly according to claim 2, including a clearance fit between said opening and said skewer shaft.

5. A quick release skewer assembly according to claim 2, including a frame element with an axially extending first opening therein; wherein said skewer shaft extends axially through said first opening; and wherein said frame element is axially clamped between said first grip face and said first outer face in said closed orientation and wherein said frame element is axially unclamped and released in said open orientation.

6. A quick release skewer assembly according to claim 3, including a frame element with an axially extending first opening therein; wherein said skewer shaft extends axially through said opening; wherein said frame element is axially clamped between said first grip face and said first outer face; and wherein said skewer shaft is radially isolated from said first opening by said first axle stub.

7. A quick release skewer assembly according to claim 6, wherein said first axle stub provides radial locating alignment between said hub assembly and said frame element.

8. A quick release skewer assembly according to claim 1, wherein said first clamping element is a discreet element connected to said skewer shaft.

9. A quick release skewer assembly according to claim 8, wherein said first clamping element is a discreet element integrally joined to said skewer shaft.

10. A quick release skewer assembly according to claim 1, wherein said first clamping element is monolithic with said skewer shaft.

11. A quick release skewer assembly according to claim 8, wherein said skewer shaft includes:
an enlarged portion adjacent said first end portion;
an axially extending shank portion extending axially inwardly from said enlarged portion;
an engagement surface extending radially outwardly between said shank portion and said enlarged portion; and
wherein said axial engagement includes an overlie engagement between said engagement surface and said first clamping element.

12. A quick release skewer assembly according to claim 11, wherein said overlie engagement is located axially outboard of said first grip face.

13. A quick release skewer assembly according to claim 11, wherein said overlie engagement is axially recessed within said first clamping element such that a portion of said first clamping element is axially outboard of said overlie engagement.

14. A quick release skewer assembly according to claim 8, including an intermediate connecting element, wherein said skewer shaft is axially engaged to said intermediate connecting element and wherein said intermediate connecting element is axially engaged to said first clamping element to provide said axial engagement to limit axially outward displacement of said first grip face with respect to said skewer shaft.

15. A quick release skewer assembly according to claim 8, wherein said first clamping element is retained to said skewer shaft in an auxiliary retained engagement to limit axially inward movement of said first clamping element relative to said skewer shaft, and wherein said auxiliary retained engagement is provided by a retaining element discreet from both said first clamping element and said skewer shaft.

16. A quick release skewer assembly according to claim 8, wherein said first clamping element is retained to said skewer shaft in an auxiliary retained engagement to limit axially inward movement of said first clamping element relative to said skewer shaft, and wherein said first clamping element is directly retained to said skewer shaft to provide said auxiliary retained engagement.

17. A quick release skewer assembly, comprising:
a skewer shaft extending along a shaft axis and including a first end portion thereof and a second end portion thereof axially spaced from said first end portion;
a first clamping element connected to said first end portion including a first grip face thereof oriented to face in a generally axially inwardly direction;
a clamping assembly adjacent said second end portion including an anchor element and a second clamping element;
wherein said second clamping element includes a second grip face thereof oriented to face in a generally axially inwardly direction axially opposed and facing said first grip face;
wherein said first grip face is axially separated from said second grip face by a grip distance along said shaft axis;
wherein said first clamping element has an axial engagement with said skewer shaft to limit axially outward displacement of said first grip face with respect to said skewer shaft;
wherein said first clamping element has a rotational engagement with said skewer shaft to limit rotational displacement of said first clamping element with respect to said skewer shaft about said shaft axis;
wherein said second anchor element is threadably connected to said skewer shaft such that said grip distance may be selectively threadably adjusted by means of said threadable connection;
wherein said clamping assembly is operative to selectively displace said second grip face relative to said anchor element in a generally linear and axial direction between: (i) an open orientation wherein said grip distance is axially expanded; and (ii) a closed orientation wherein said grip distance is axially contracted such that said first grip face and said second grip face are axially proximal to each other relative to said open orientation;
wherein said first clamping element is a discreet element connected to said skewer shaft; and
wherein at least one of: (i) said skewer shaft is deformed by said first clamping element in a deformed engagement therebetween; and (ii) said first clamping element is deformed by said skewer shaft in a deformed engagement therebetween, and wherein said deformed engagement serves to limit axial displacement of said first clamping element with respect to said skewer shaft.

18. A quick release skewer assembly according to claim 17, wherein said deformed engagement is a deformably clinched engagement to limit axially inward movement of said first clamping element relative to said skewer shaft.

19. A quick release skewer assembly according to claim 8, wherein said first clamping element is retained to said skewer shaft in an auxiliary retained engagement to limit axially inward movement of said first clamping element relative to said skewer shaft, and wherein said auxiliary retained engagement is a frictionally gripping engagement.

20. A quick release skewer assembly, comprising:
a skewer shaft extending along a shaft axis and including a first end portion thereof and a second end portion thereof axially spaced from said first end portion;

a first clamping element connected to said first end portion including a first grip face thereof oriented to face in a generally axially inwardly direction;

a clamping assembly adjacent said second end portion including an anchor element and a second clamping element;

wherein said second clamping element includes a second grip face thereof oriented to face in a generally axially inwardly direction axially opposed and facing said first grip face;

wherein said first grip face is axially separated from said second grip face by a grip distance along said shaft axis;

wherein said first clamping element has an axial engagement with said skewer shaft to limit axially outward displacement of said first grip face with respect to said skewer shaft;

wherein said first clamping element has a rotational engagement with said skewer shaft to limit rotational displacement of said first clamping element with respect to said skewer shaft about said shaft axis;

wherein said second anchor element is threadably connected to said skewer shaft such that said grip distance may be selectively threadably adjusted by means of said threadable connection;

wherein said clamping assembly is operative to selectively displace said second grip face relative to said anchor element in a generally linear and axial direction between: (i) an open orientation wherein said grip distance is axially expanded; and (ii) a closed orientation wherein said grip distance is axially contracted such that said first grip face and said second grip face are axially proximal to each other relative to said open orientation;

wherein said first clamping element is a discreet element connected to said skewer shaft; and wherein said skewer shaft includes noncircular geometry that is noncircular about said shaft axis, and wherein first clamping element includes noncircular geometry that is noncircular about said shaft axis, and wherein said noncircular geometry of said skewer shaft has a rotationally keyed engagement with said noncircular geometry of said first clamping element to limit rotational displacement of said first clamping element relative to said skewer shaft about said shaft axis.

21. A quick release skewer assembly according to claim 20, wherein said skewer shaft includes:
an enlarged portion adjacent said first end portion;
an axially extending shank portion extending axially inwardly from said enlarged portion;
an engagement surface extending radially outwardly between said shank portion and said enlarged portion;
wherein said axial engagement includes an overlie engagement between said engagement surface and said first clamping element; and
wherein said noncircular geometry is located axially outboard of said overlie engagement.

22. A quick release skewer assembly according to claim 20, wherein said skewer shaft includes:
an enlarged portion adjacent said first end portion;
an axially extending shank portion extending axially inwardly from said enlarged portion;
an engagement surface extending radially outwardly between said shank portion and said enlarged portion;
wherein said axial engagement includes an overlie engagement between said engagement surface and said first clamping element; and
wherein said noncircular geometry is located axially inboard of said overlie engagement.

23. A quick release skewer assembly according to claim 20, wherein said noncircular geometry includes a configured surface of said skewer shaft and wherein said configured surface is a knurled surface.

24. A quick release skewer assembly according to claim 1, wherein said rotational link includes a frictional gripping engagement between said skewer shaft and said first clamping element.

25. A quick release skewer assembly, comprising:
a skewer shaft extending along a shaft axis and including a first end portion thereof and a second end portion thereof axially spaced from said first end portion;
a first clamping element connected to said first end portion including a first grip face thereof oriented to face in a generally axially inwardly direction;
a clamping assembly adjacent said second end portion including an anchor element and a second clamping element;
wherein said second clamping element includes a second grip face thereof oriented to face in a generally axially inwardly direction axially opposed and facing said first grip face;
wherein said first grip face is axially separated from said second grip face by a grip distance along said shaft axis;
wherein said first clamping element has an axial engagement with said skewer shaft to limit axially outward displacement of said first grip face with respect to said skewer shaft;
wherein said first clamping element has a rotational engagement with said skewer shaft to limit rotational displacement of said first clamping element with respect to said skewer shaft about said shaft axis;
wherein said second anchor element is threadably connected to said skewer shaft such that said grip distance may be selectively threadably adjusted by means of said threadable connection;
wherein said clamping assembly is operative to selectively displace said second grip face relative to said anchor element in a generally linear and axial direction between: (i) an open orientation wherein said grip distance is axially expanded; and (ii) a closed orientation wherein said grip distance is axially contracted such that said first grip face and said second grip face are axially proximal to each other relative to said open orientation;
wherein said first clamping element is a discreet element connected to said skewer shaft; and
wherein at least one of: (i) said skewer shaft is deformed by said first clamping element in a deformed engagement therebetween; and (ii) said first clamping element is deformed by said skewer shaft in a deformed engagement therebetween, and wherein said deformed engagement serves to provide said rotational engagement to limit rotational displacement of said first clamping element with respect to said skewer shaft about said shaft axis.

26. A quick release skewer assembly according to claim 25, wherein said skewer shaft includes noncircular geometry that is noncircular about said shaft axis, and wherein said deformed engagement includes plastic deformation of said first clamping element to at least partially conform to said noncircular geometry of said skewer shaft and to create a rotationally keyed engagement to limit rotational displacement of said first clamping element with respect to said noncircular geometry of said skewer shaft about said shaft axis.

27. A quick release skewer assembly according to claim 1, wherein said rotational link includes a direct rotational link between said first clamping element and said skewer shaft.

28. A quick release skewer assembly according to claim 1, including an intermediate connecting element, wherein said skewer shaft is rotationally engaged to said intermediate connecting element and wherein said intermediate connecting element is rotationally engaged to said first clamping element to provide said rotational link to limit rotational displacement of said first clamping element with respect to said skewer shaft about said shaft axis.

29. A quick release skewer assembly according to claim 1, including a first axial outboard terminus of said quick release skewer assembly adjacent said first end portion and located axially outboard of said first grip face, and an axial width between said first grip face and said first axial outboard terminus, wherein said axial width is less than or equal to 10 millimeters.

30. A quick release skewer assembly according to claim 1, wherein said first clamping element is a multi-piece assembly, including: (i) a washer element axially and rotationally engaged to said skewer shaft; and (ii) a gripping element that includes said first grip face, wherein said gripping element is rotatable about said shaft axis relative to said washer element.

31. A quick release skewer assembly according to claim 1, wherein said first clamping element is a multi-piece assembly, including: (i) a washer element axially and rotationally engaged to said skewer shaft; and (ii) a gripping element that includes said first grip face, wherein said gripping element is rotatably engaged to said washer element to restrict rotation therebetween about said shaft axis.

32. A quick release skewer assembly according to claim 1, wherein at least a portion of said first clamping element includes a configured surface to facilitate manual manipulation of said first clamping element about said shaft axis.

33. A quick release skewer assembly according to claim 32 wherein said configured surface is a circumferentially configured surface comprising a raised projecting surface circumferentially spaced from a recessed surface that is recessed relative to said projecting surface, wherein said projecting surface is at least one of radially outboard and axially outboard relative to said recessed surface.

34. A quick release skewer assembly according to claim 1, wherein said clamping assembly includes cam action between a cam element and a follower element, wherein said follower element is displaceable in a generally linear and axial direction, and wherein said cam action provides means to selectively displace said second grip face relative to said anchor element.

35. A quick release skewer assembly according to claim 34, wherein said cam element is a rotary cam element that is rotatable about a pivot axis, and wherein said second clamping element is axially engaged to said follower element.

36. A quick release skewer assembly according to claim 35, wherein said rotary cam element is rotatable about a pivot element and wherein said anchor element is axially connected to said pivot element.

37. A quick release skewer assembly according to claim 1, wherein said threadable connection between said skewer shaft and said anchor element may be selectively locked to inhibit further threadable adjustment of said grip distance.

38. A quick release skewer assembly according to claim 1, wherein said threadable adjustment is achieved by rotational manipulation of said first clamping element.

39. A quick release skewer assembly according to claim 8, wherein said first clamping element is rotatably fixed to said skewer shaft.

40. A quick release skewer assembly according to claim 8, wherein said first clamping element has a circumferential engagement with said skewer shaft to limit the rotational displacement of said first clamping element with respect to said skewer shaft about said shaft axis.

41. A quick release skewer assembly according to claim 1, wherein said first clamping element is axially fixed to said skewer shaft to limit the axially outward displacement of said first clamping element relative to said skewer shaft.

* * * * *